(12) United States Patent
Teo et al.

(10) Patent No.: US 9,533,261 B2
(45) Date of Patent: Jan. 3, 2017

(54) POTTING METHOD

(71) Applicants: Ying Hao Teo, Quakers Hill (AU);
Michael Collignon, Annangrove (AU);
Robert J. McMahon, Leichhardt (AU)

(72) Inventors: Ying Hao Teo, Quakers Hill (AU);
Michael Collignon, Annangrove (AU);
Robert J. McMahon, Leichhardt (AU)

(73) Assignee: Evoqua Water Technologies LLC, Warrendale, PA (US)

( * ) Notice: Subject to any disclaimer, the term of this patent is extended or adjusted under 35 U.S.C. 154(b) by 0 days.

(21) Appl. No.: 14/410,731

(22) PCT Filed: Jun. 26, 2013

(86) PCT No.: PCT/US2013/047848
§ 371 (c)(1),
(2) Date: Dec. 23, 2014

(87) PCT Pub. No.: WO2014/004656
PCT Pub. Date: Jan. 3, 2014

(65) Prior Publication Data
US 2015/0136687 A1    May 21, 2015

(30) Foreign Application Priority Data
Jun. 28, 2012  (AU) ................................ 2012902751

(51) Int. Cl.
*B01D 63/00* (2006.01)
*B01D 39/00* (2006.01)
(Continued)

(52) U.S. Cl.
CPC ............. *B01D 63/021* (2013.01); *B01D 63/02* (2013.01); *B01D 63/022* (2013.01);
(Continued)

(58) Field of Classification Search
CPC . B01D 63/022; B01D 63/02; B01D 2321/185; B01D 61/18; B01D 2315/06; B01D 63/021; B01D 2313/21; B01D 2313/26; B01D 63/081; B29C 41/20; B29C 45/1671
See application file for complete search history.

(56) References Cited

U.S. PATENT DOCUMENTS 256,008 A    4/1882  Leak
285,321 A    9/1883  Tams
(Continued)

FOREIGN PATENT DOCUMENTS

AU    34400/84 A    4/1985
AU    77066/87 A    2/1988
(Continued)

OTHER PUBLICATIONS

Berg et al., "Flux Decline in Ultrafiltration Processes," Desalination, 77 (1990) pp. 101-133.
(Continued)

*Primary Examiner* — Ana Fortuna

(57) ABSTRACT

Disclosed herein are aspects and embodiments of filtration membrane modules including porous membranes and methods and structures associated with potting ends of the porous membranes in the membrane modules. In one example, there is provided a method of forming a filtration module. The method comprises securing a portion of a porous membrane in a pre-pot, positioning at least a portion of the pre-pot in a potting mold, introducing a pot forming substance into the potting mold, the pot forming substance surrounding at least a portion of the pre-pot and at least a portion of the porous membrane, curing the second pot forming substance to form a membrane pot, and separating the membrane pot from the potting mold.

23 Claims, 7 Drawing Sheets

(51) Int. Cl.
  *B29C 45/14*  (2006.01)
  *B01D 63/02*  (2006.01)
  *B29C 33/00*  (2006.01)
  *B27N 3/00*  (2006.01)
  *B29C 45/16*  (2006.01)
  *B29C 39/02*  (2006.01)
  *B29L 31/14*  (2006.01)

(52) U.S. Cl.
  CPC ...... *B29C 39/025* (2013.01); *B29C 45/14065* (2013.01); *B29C 45/1671* (2013.01); *B01D 2313/04* (2013.01); *B29C 45/14467* (2013.01); *B29C 45/14786* (2013.01); *B29C 2045/14147* (2013.01); *B29L 2031/14* (2013.01)

(56) References Cited

U.S. PATENT DOCUMENTS

| | | | |
|---|---|---|---|
| 403,507 | A | 5/1889 | Bode |
| 511,995 | A | 1/1894 | Buckley |
| 1,997,074 | A | 4/1935 | Novotny |
| 2,080,783 | A | 5/1937 | Petersen |
| 2,105,700 | A | 1/1938 | Ramage |
| 2,843,038 | A | 7/1958 | Manspeaker |
| 2,926,086 | A | 2/1960 | Chenicek et al. |
| 3,068,655 | A | 12/1962 | Murray et al. |
| 3,139,401 | A | 6/1964 | Hach |
| 3,183,191 | A | 5/1965 | Hach |
| 3,191,674 | A | 6/1965 | Richardson |
| 3,198,636 | A | 8/1965 | Bouthilet |
| 3,228,876 | A | 1/1966 | Mahon |
| 3,246,761 | A | 4/1966 | Bryan et al. |
| 3,275,554 | A | 9/1966 | Wagenaar |
| 3,442,002 | A | 5/1969 | Geary et al. |
| 3,462,362 | A | 8/1969 | Kollsman |
| 3,472,168 | A | 10/1969 | Inoue et al. |
| 3,472,765 | A | 10/1969 | Budd et al. |
| 3,492,698 | A | 2/1970 | Geary et al. |
| 3,501,798 | A | 3/1970 | Carraro |
| 3,505,215 | A | 4/1970 | Bray |
| 3,556,305 | A | 1/1971 | Shorr |
| 3,563,860 | A | 2/1971 | Henderyckx |
| 3,591,010 | A | 7/1971 | Pall et al. |
| 3,592,450 | A | 7/1971 | Rippon |
| 3,625,827 | A | 12/1971 | Wildi et al. |
| 3,628,775 | A | 12/1971 | McConnell et al. |
| 3,654,147 | A | 4/1972 | Levin |
| 3,679,052 | A | 7/1972 | Asper |
| 3,693,406 | A | 9/1972 | Tobin, III |
| 3,700,561 | A | 10/1972 | Ziffer |
| 3,700,591 | A | 10/1972 | Higley |
| 3,708,071 | A | 1/1973 | Crowley |
| 3,728,256 | A | 4/1973 | Cooper |
| 3,763,055 | A | 10/1973 | White et al. |
| 3,791,631 | A | 2/1974 | Meyer |
| 3,795,609 | A | 3/1974 | Hill et al. |
| 3,804,258 | A | 4/1974 | Okuniewski et al. |
| 3,827,566 | A | 8/1974 | Ponce |
| 3,843,809 | A | 10/1974 | Luck |
| 3,876,738 | A | 4/1975 | Marinaccio et al. |
| 3,912,624 | A | 10/1975 | Jennings |
| 3,937,015 | A | 2/1976 | Akado et al. |
| 3,955,998 | A | 5/1976 | Clampitt et al. |
| 3,962,095 | A | 6/1976 | Luppi |
| 3,968,192 | A | 7/1976 | Hoffman, III et al. |
| 3,992,301 | A | 11/1976 | Shippey et al. |
| 3,993,816 | A | 11/1976 | Baudet et al. |
| 4,016,078 | A | 4/1977 | Clark |
| 4,049,765 | A | 9/1977 | Yamazaki |
| 4,076,656 | A | 2/1978 | White et al. |
| 4,082,683 | A | 4/1978 | Galesloot |
| 4,105,556 | A | 8/1978 | O'Amaddio et al. |
| 4,105,731 | A | 8/1978 | Yamazaki |
| 4,107,043 | A | 8/1978 | McKinney |
| 4,130,622 | A | 12/1978 | Pawlak |
| 4,138,460 | A | 2/1979 | Tigner |
| 4,157,899 | A | 6/1979 | Wheaton |
| 4,169,873 | A | 10/1979 | Lipert |
| 4,183,890 | A | 1/1980 | Bollinger |
| 4,187,263 | A | 2/1980 | Lipert |
| 4,188,817 | A | 2/1980 | Steigelmann |
| 4,190,411 | A | 2/1980 | Fujimoto |
| 4,190,419 | A | 2/1980 | Bauer |
| 4,192,750 | A | 3/1980 | Elfes et al. |
| 4,193,780 | A | 3/1980 | Cotton, Jr. et al. |
| 4,203,848 | A | 5/1980 | Grandine, II |
| 4,204,961 | A | 5/1980 | Cusato, Jr. |
| 4,218,324 | A | 8/1980 | Hartmann et al. |
| 4,226,921 | A | 10/1980 | Tsang |
| 4,227,295 | A | 10/1980 | Bodnar et al. |
| 4,230,583 | A | 10/1980 | Chiolle et al. |
| 4,243,525 | A | 1/1981 | Greenberg |
| 4,247,498 | A | 1/1981 | Castro |
| 4,248,648 | A | 2/1981 | Kopp |
| 4,253,936 | A | 3/1981 | Leysen et al. |
| 4,271,026 | A | 6/1981 | Chen et al. |
| 4,272,379 | A | 6/1981 | Pollock |
| 4,302,336 | A | 11/1981 | Kawaguchi et al. |
| 4,315,819 | A | 2/1982 | King et al. |
| 4,323,453 | A | 4/1982 | Zampini |
| 4,340,479 | A | 7/1982 | Pall |
| 4,350,592 | A | 9/1982 | Kronsbein |
| 4,353,802 | A | 10/1982 | Hara et al. |
| 4,359,359 | A | 11/1982 | Gerlach et al. |
| 4,367,139 | A | 1/1983 | Graham |
| 4,367,140 | A | 1/1983 | Wilson |
| 4,369,605 | A | 1/1983 | Opersteny et al. |
| 4,371,427 | A | 2/1983 | Holler et al. |
| 4,384,474 | A | 5/1983 | Kowalski |
| 4,388,189 | A | 6/1983 | Kawaguchi et al. |
| 4,389,363 | A | 6/1983 | Molthop |
| 4,405,688 | A | 9/1983 | Lowery et al. |
| 4,407,975 | A | 10/1983 | Yamaguchi |
| 4,414,113 | A | 11/1983 | LaTerra |
| 4,414,172 | A | 11/1983 | Leason |
| 4,415,452 | A | 11/1983 | Heil et al. |
| 4,431,545 | A | 2/1984 | Pall et al. |
| 4,451,369 | A | 5/1984 | Sekino et al. |
| 4,462,855 | A | 7/1984 | Yankowsky et al. |
| 4,467,001 | A | 8/1984 | Coplan et al. |
| 4,476,015 | A | 10/1984 | Schmitt et al. |
| 4,476,112 | A | 10/1984 | Aversano |
| 4,491,522 | A | 1/1985 | Ishida et al. |
| 4,496,470 | A | 1/1985 | Kapiloff et al. |
| 4,511,471 | A | 4/1985 | Muller |
| 4,519,909 | A | 5/1985 | Castro |
| 4,539,940 | A | 9/1985 | Young |
| 4,540,490 | A | 9/1985 | Shibata et al. |
| 4,545,862 | A | 10/1985 | Gore et al. |
| 4,547,289 | A | 10/1985 | Okano et al. |
| 4,609,465 | A | 9/1986 | Miller |
| 4,610,789 | A | 9/1986 | Barch |
| 4,614,109 | A | 9/1986 | Hofmann |
| 4,623,460 | A | 11/1986 | Kuzumoto et al. |
| 4,623,670 | A | 11/1986 | Mutoh et al. |
| 4,629,563 | A | 12/1986 | Wrasidlo |
| 4,632,745 | A | 12/1986 | Giuffrida et al. |
| 4,636,296 | A | 1/1987 | Kunz |
| 4,647,377 | A | 3/1987 | Miura |
| 4,650,586 | A | 3/1987 | Ellis, III |
| 4,650,596 | A | 3/1987 | Schlueter et al. |
| 4,656,865 | A | 4/1987 | Callan |
| 4,660,411 | A | 4/1987 | Reid |
| 4,666,543 | A | 5/1987 | Kawano |
| 4,670,145 | A | 6/1987 | Edwards |
| 4,673,507 | A | 6/1987 | Brown |
| 4,687,561 | A | 8/1987 | Kunz |
| 4,687,578 | A | 8/1987 | Stookey |
| 4,688,511 | A | 8/1987 | Gerlach et al. |
| 4,689,191 | A | 8/1987 | Beck et al. |
| 4,702,830 | A | 10/1987 | Makino et al. |
| 4,702,836 | A | 10/1987 | Mutoh et al. |
| 4,702,840 | A | 10/1987 | Degen et al. |
| 4,707,266 | A | 11/1987 | Degen et al. |

(56) References Cited

U.S. PATENT DOCUMENTS

| | | |
|---|---|---|
| 4,708,799 A | 11/1987 | Gerlach et al. |
| 4,718,270 A | 1/1988 | Storr |
| 4,744,240 A | 5/1988 | Reichelt |
| 4,749,487 A | 6/1988 | Lefebvre |
| 4,752,421 A | 6/1988 | Makino |
| 4,756,875 A | 7/1988 | Tajima et al. |
| 4,763,612 A | 8/1988 | Iwanami |
| 4,769,140 A | 9/1988 | van Dijk et al. |
| 4,774,132 A | 9/1988 | Joffee et al. |
| 4,775,471 A | 10/1988 | Nagai et al. |
| 4,779,448 A | 10/1988 | Gogins |
| 4,781,831 A | 11/1988 | Goldsmith |
| 4,784,771 A | 11/1988 | Wathen et al. |
| 4,793,932 A | 12/1988 | Ford et al. |
| 4,797,187 A | 1/1989 | Davis et al. |
| 4,797,211 A | 1/1989 | Ehrfeld et al. |
| 4,800,019 A | 1/1989 | Bikson et al. |
| 4,812,235 A | 3/1989 | Seleman et al. |
| 4,824,563 A | 4/1989 | Iwahori et al. |
| 4,828,696 A | 5/1989 | Makino et al. |
| 4,834,998 A | 5/1989 | Shrikhande |
| 4,839,048 A | 6/1989 | Reed et al. |
| 4,840,227 A | 6/1989 | Schmidt |
| 4,846,970 A | 7/1989 | Bertelsen et al. |
| 4,867,883 A | 9/1989 | Daigger et al. |
| 4,876,006 A | 10/1989 | Ohkubo et al. |
| 4,888,115 A | 12/1989 | Marinaccio et al. |
| 4,889,620 A | 12/1989 | Schmit et al. |
| 4,904,426 A | 2/1990 | Lundgard et al. |
| 4,908,114 A | 3/1990 | Ayers |
| 4,911,838 A | 3/1990 | Tanaka |
| 4,919,815 A | 4/1990 | Copa et al. |
| 4,931,186 A | 6/1990 | Ford et al. |
| 4,933,084 A | 6/1990 | Bandel et al. |
| 4,952,317 A | 8/1990 | Culkin |
| 4,963,304 A | 10/1990 | Im et al. |
| 4,966,699 A | 10/1990 | Sasaki et al. |
| 4,968,430 A | 11/1990 | Hildenbrand et al. |
| 4,968,733 A | 11/1990 | Muller et al. |
| 4,980,066 A | 12/1990 | Slegers |
| 4,988,444 A | 1/1991 | Applegate et al. |
| 4,990,251 A * | 2/1991 | Spranger ............... B01D 63/02 210/321.8 |
| 4,999,038 A | 3/1991 | Lundberg |
| 5,002,666 A | 3/1991 | Matsumoto et al. |
| 5,005,430 A | 4/1991 | Kibler et al. |
| 5,015,275 A | 5/1991 | Beck et al. |
| 5,024,762 A | 6/1991 | Ford et al. |
| 5,034,125 A | 7/1991 | Karbachsch et al. |
| 5,043,113 A | 8/1991 | Kafchinski et al. |
| 5,059,317 A | 10/1991 | Marius et al. |
| 5,066,375 A | 11/1991 | Parsi et al. |
| 5,066,402 A | 11/1991 | Anselme et al. |
| 5,069,065 A | 12/1991 | Sprunt et al. |
| 5,069,353 A | 12/1991 | Espenan |
| 5,075,044 A | 12/1991 | Augem |
| 5,075,065 A | 12/1991 | Effenberger et al. |
| 5,079,272 A | 1/1992 | Allegrezza, Jr. et al. |
| 5,080,770 A | 1/1992 | Culkin |
| 5,094,750 A | 3/1992 | Kopp et al. |
| 5,094,867 A | 3/1992 | Detering et al. |
| 5,098,567 A | 3/1992 | Nishiguchi |
| 5,102,550 A | 4/1992 | Pizzino et al. |
| 5,104,535 A | 4/1992 | Cote et al. |
| 5,104,546 A | 4/1992 | Filson et al. |
| H1045 H | 5/1992 | Wilson |
| 5,135,663 A | 8/1992 | Newberth, III et al. |
| 5,137,631 A | 8/1992 | Eckman et al. |
| 5,138,870 A | 8/1992 | Lyssy |
| 5,147,553 A | 9/1992 | Waite |
| 5,151,191 A | 9/1992 | Sunaoka et al. |
| 5,156,738 A | 10/1992 | Maxson |
| 5,158,721 A | 10/1992 | Allegrezza, Jr. et al. |
| 5,169,528 A | 12/1992 | Karbachsch et al. |
| 5,169,530 A | 12/1992 | Schucker et al. |
| 5,180,407 A | 1/1993 | DeMarco |
| 5,182,019 A | 1/1993 | Cote et al. |
| 5,186,821 A | 2/1993 | Murphy |
| 5,192,442 A | 3/1993 | Piccirillo et al. |
| 5,192,456 A | 3/1993 | Ishida et al. |
| 5,192,478 A | 3/1993 | Caskey |
| 5,198,116 A | 3/1993 | Comstock et al. |
| 5,198,162 A | 3/1993 | Park et al. |
| 5,203,405 A | 4/1993 | Gentry et al. |
| 5,209,852 A | 5/1993 | Sunaoka et al. |
| 5,211,823 A | 5/1993 | Giuffrida et al. |
| 5,221,478 A | 6/1993 | Dhingra et al. |
| 5,227,063 A | 7/1993 | Langerak et al. |
| 5,244,579 A | 9/1993 | Horner et al. |
| 5,262,054 A | 11/1993 | Wheeler |
| 5,269,919 A | 12/1993 | von Medlin |
| 5,271,830 A | 12/1993 | Faivre et al. |
| 5,275,766 A | 1/1994 | Gadkaree et al. |
| 5,286,324 A | 2/1994 | Kawai et al. |
| 5,290,451 A | 3/1994 | Koster et al. |
| 5,290,457 A | 3/1994 | Karbachsch et al. |
| 5,297,420 A | 3/1994 | Gilliland et al. |
| 5,316,671 A | 5/1994 | Murphy |
| 5,320,760 A | 6/1994 | Freund et al. |
| 5,353,630 A | 10/1994 | Soda et al. |
| 5,354,470 A | 10/1994 | Seita et al. |
| 5,358,732 A | 10/1994 | Seifter et al. |
| 5,361,625 A | 11/1994 | Ylvisaker |
| 5,364,527 A | 11/1994 | Zimmermann et al. |
| 5,364,529 A | 11/1994 | Morin et al. |
| 5,374,353 A | 12/1994 | Murphy |
| 5,389,260 A | 2/1995 | Hemp et al. |
| 5,393,433 A | 2/1995 | Espenan et al. |
| 5,396,019 A | 3/1995 | Sartori et al. |
| 5,401,401 A | 3/1995 | Hickok et al. |
| 5,401,405 A | 3/1995 | McDougald |
| 5,403,479 A | 4/1995 | Smith et al. |
| 5,411,663 A | 5/1995 | Johnson |
| 5,417,101 A | 5/1995 | Weich |
| 5,419,816 A | 5/1995 | Sampson et al. |
| 5,425,415 A | 6/1995 | Master et al. |
| 5,451,317 A | 9/1995 | Ishida et al. |
| 5,458,779 A | 10/1995 | Odegaard |
| 5,468,397 A | 11/1995 | Barboza et al. |
| 5,470,469 A | 11/1995 | Eckman |
| 5,477,731 A | 12/1995 | Mouton |
| 5,479,590 A | 12/1995 | Lin |
| 5,484,528 A | 1/1996 | Yagi et al. |
| 5,490,939 A | 2/1996 | Gerigk et al. |
| 5,501,798 A | 3/1996 | Al-Samadi et al. |
| 5,525,220 A | 6/1996 | Yagi et al. |
| 5,531,900 A | 7/1996 | Raghavan et al. |
| 5,552,047 A | 9/1996 | Oshida et al. |
| 5,556,591 A | 9/1996 | Jallerat et al. |
| 5,597,732 A | 1/1997 | Bryan-Brown |
| 5,607,593 A | 3/1997 | Cote et al. |
| 5,626,755 A | 5/1997 | Keyser et al. |
| 5,633,163 A | 5/1997 | Cameron |
| 5,639,373 A | 6/1997 | Mahendran et al. |
| 5,647,988 A | 7/1997 | Kawanishi et al. |
| 5,670,053 A | 9/1997 | Collentro et al. |
| 5,677,360 A | 10/1997 | Yamamori et al. |
| 5,688,460 A | 11/1997 | Ruschke |
| 5,690,830 A | 11/1997 | Ohtani et al. |
| 5,733,456 A | 3/1998 | Okey et al. |
| 5,744,037 A | 4/1998 | Fujimura et al. |
| 5,747,605 A | 5/1998 | Breant et al. |
| 5,766,479 A | 6/1998 | Collentro et al. |
| D396,046 S | 7/1998 | Scheel et al. |
| 5,783,083 A | 7/1998 | Henshaw et al. |
| 5,786,528 A | 7/1998 | Dileo et al. |
| D396,726 S | 8/1998 | Sadr et al. |
| 5,814,234 A | 9/1998 | Bower et al. |
| D400,890 S | 11/1998 | Gambardella |
| 5,843,069 A | 12/1998 | Butler et al. |
| 5,846,424 A | 12/1998 | Khudenko |
| 5,846,425 A | 12/1998 | Whiteman |
| 5,871,823 A | 2/1999 | Anders et al. |
| 5,888,401 A | 3/1999 | Nguyen |

(56) References Cited

U.S. PATENT DOCUMENTS

| | | |
|---|---|---|
| 5,895,521 A | 4/1999 | Otsuka et al. |
| 5,895,570 A | 4/1999 | Liang |
| 5,906,739 A | 5/1999 | Osterland et al. |
| 5,906,742 A | 5/1999 | Wang et al. |
| 5,918,264 A | 6/1999 | Drummond et al. |
| 5,942,113 A | 8/1999 | Morimura |
| 5,944,997 A | 8/1999 | Pedersen et al. |
| 5,951,878 A | 9/1999 | Astrom |
| 5,958,243 A | 9/1999 | Lawrence et al. |
| 5,961,830 A | 10/1999 | Barnett |
| 5,968,357 A | 10/1999 | Doelle et al. |
| 5,988,400 A | 11/1999 | Karachevtcev et al. |
| 5,989,428 A | 11/1999 | Goronszy |
| 5,997,745 A | 12/1999 | Tonelli et al. |
| 6,001,254 A | 12/1999 | Espenan et al. |
| 6,007,712 A | 12/1999 | Tanaka et al. |
| 6,017,451 A | 1/2000 | Kopf |
| 6,036,030 A | 3/2000 | Stone et al. |
| 6,045,698 A | 4/2000 | Cote et al. |
| 6,045,899 A | 4/2000 | Wang et al. |
| 6,048,454 A | 4/2000 | Jenkins |
| 6,048,455 A | 4/2000 | Janik |
| 6,066,401 A | 5/2000 | Stilburn |
| 6,071,404 A | 6/2000 | Tsui |
| 6,074,718 A | 6/2000 | Puglia et al. |
| 6,077,435 A | 6/2000 | Beck et al. |
| 6,083,381 A | 7/2000 | Connelly et al. |
| 6,083,393 A | 7/2000 | Wu et al. |
| 6,096,213 A | 8/2000 | Radovanovic et al. |
| 6,113,782 A | 9/2000 | Leonard |
| 6,120,688 A | 9/2000 | Daly et al. |
| 6,126,819 A * | 10/2000 | Heine .................. B01D 63/024 210/139 |
| 6,149,817 A | 11/2000 | Peterson et al. |
| 6,156,200 A * | 12/2000 | Zha .................. B01D 61/18 210/321.69 |
| 6,162,020 A | 12/2000 | Kondo |
| 6,193,890 B1 | 2/2001 | Pedersen et al. |
| 6,214,231 B1 | 4/2001 | Cote et al. |
| 6,214,232 B1 | 4/2001 | Baurmeister et al. |
| 6,217,770 B1 | 4/2001 | Haney et al. |
| 6,221,247 B1 | 4/2001 | Nemser et al. |
| 6,224,767 B1 | 5/2001 | Fujiwara et al. |
| 6,264,839 B1 | 7/2001 | Mohr et al. |
| 6,277,512 B1 | 8/2001 | Hamrock et al. |
| 6,280,626 B1 | 8/2001 | Miyashita et al. |
| 6,284,135 B1 | 9/2001 | Ookata |
| 6,299,773 B1 | 10/2001 | Takamura et al. |
| 6,303,026 B1 | 10/2001 | Lindbo |
| 6,303,035 B1 | 10/2001 | Cote et al. |
| 6,315,895 B1 | 11/2001 | Summerton et al. |
| 6,319,411 B1 | 11/2001 | Cote |
| 6,322,703 B1 | 11/2001 | Taniguchi et al. |
| 6,325,928 B1 | 12/2001 | Pedersen et al. |
| 6,325,938 B1 | 12/2001 | Miyashita et al. |
| 6,331,248 B1 | 12/2001 | Taniguchi et al. |
| 6,337,018 B1 | 1/2002 | Mickols |
| RE37,549 E | 2/2002 | Mahendran et al. |
| 6,349,835 B1 | 2/2002 | Saux et al. |
| 6,354,444 B1 | 3/2002 | Mahendran et al. |
| 6,361,695 B1 | 3/2002 | Husain et al. |
| 6,368,819 B1 | 4/2002 | Gaddy et al. |
| 6,372,138 B1 | 4/2002 | Cho et al. |
| 6,383,369 B2 | 5/2002 | Elston |
| 6,387,189 B1 | 5/2002 | Groschl et al. |
| 6,402,955 B2 | 6/2002 | Ookata |
| 6,423,214 B1 | 7/2002 | Lindbo |
| 6,423,784 B1 | 7/2002 | Hamrock et al. |
| 6,432,310 B1 | 8/2002 | Andou et al. |
| 6,440,303 B2 | 8/2002 | Spriegel |
| D462,699 S | 9/2002 | Johnson et al. |
| 6,444,124 B1 | 9/2002 | Onyeche et al. |
| 6,468,430 B1 | 10/2002 | Kimura et al. |
| 6,471,869 B1 | 10/2002 | Yanou et al. |
| 6,485,645 B1 | 11/2002 | Husain et al. |
| 6,495,041 B2 | 12/2002 | Taniguchi et al. |
| 6,517,723 B1 | 2/2003 | Daigger et al. |
| 6,524,733 B1 | 2/2003 | Nonobe |
| 6,550,747 B2 | 4/2003 | Rabie et al. |
| 6,562,237 B1 | 5/2003 | Olaopa |
| 6,576,136 B1 | 6/2003 | De Moel et al. |
| 6,592,762 B2 | 7/2003 | Smith |
| D478,913 S | 8/2003 | Johnson et al. |
| 6,613,222 B2 | 9/2003 | Mikkelson et al. |
| 6,623,643 B2 | 9/2003 | Chisholm et al. |
| 6,627,082 B2 | 9/2003 | Del Vecchio et al. |
| 6,635,179 B1 | 10/2003 | Summerton et al. |
| 6,641,733 B2 | 11/2003 | Zha et al. |
| 6,645,374 B2 | 11/2003 | Cote et al. |
| 6,656,356 B2 | 12/2003 | Gungerich et al. |
| 6,685,832 B2 | 2/2004 | Mahendran et al. |
| 6,696,465 B2 | 2/2004 | Dellaria et al. |
| 6,702,561 B2 | 3/2004 | Stillig et al. |
| 6,706,185 B2 | 3/2004 | Goel et al. |
| 6,706,189 B2 | 3/2004 | Rabie et al. |
| 6,708,957 B2 | 3/2004 | Guibert et al. |
| 6,712,970 B1 | 3/2004 | Trivedi |
| 6,721,529 B2 | 4/2004 | Chen et al. |
| 6,723,242 B1 | 4/2004 | Ohkata et al. |
| 6,723,758 B2 | 4/2004 | Stone et al. |
| 6,727,305 B1 | 4/2004 | Pavez Aranguiz |
| 6,743,362 B1 | 6/2004 | Porteous et al. |
| 6,755,894 B2 * | 6/2004 | Bikson .................. B01D 53/22 210/321.8 |
| 6,755,970 B1 | 6/2004 | Knappe et al. |
| 6,758,972 B2 | 7/2004 | Vriens et al. |
| 6,761,826 B2 | 7/2004 | Bender |
| 6,770,202 B1 | 8/2004 | Kidd et al. |
| 6,780,466 B2 | 8/2004 | Grangeon et al. |
| 6,783,008 B2 | 8/2004 | Zha et al. |
| 6,790,347 B2 | 9/2004 | Jeong et al. |
| 6,790,912 B2 | 9/2004 | Blong |
| 6,805,806 B2 | 10/2004 | Arnaud |
| 6,808,629 B2 | 10/2004 | Wouters-Wasiak et al. |
| 6,811,696 B2 | 11/2004 | Wang et al. |
| 6,814,861 B2 | 11/2004 | Husain et al. |
| 6,821,420 B2 | 11/2004 | Zha et al. |
| 6,830,782 B2 | 12/2004 | Kanazawa |
| 6,840,251 B2 | 1/2005 | Gill et al. |
| 6,841,070 B2 | 1/2005 | Zha et al. |
| 6,861,466 B2 | 3/2005 | Dadalas et al. |
| 6,863,816 B2 | 3/2005 | Austin et al. |
| 6,863,817 B2 | 3/2005 | Liu et al. |
| 6,863,818 B2 | 3/2005 | Daigger et al. |
| 6,863,823 B2 | 3/2005 | Cote |
| 6,869,534 B2 | 3/2005 | McDowell et al. |
| 6,881,343 B2 | 4/2005 | Rabie et al. |
| 6,884,375 B2 | 4/2005 | Wang et al. |
| 6,890,435 B2 | 5/2005 | Ji et al. |
| 6,890,645 B2 | 5/2005 | Disse et al. |
| 6,893,568 B1 | 5/2005 | Janson et al. |
| 6,936,085 B2 | 8/2005 | DeMarco |
| 6,946,073 B2 | 9/2005 | Daigger et al. |
| 6,952,258 B2 | 10/2005 | Ebert et al. |
| 6,955,762 B2 | 10/2005 | Gallagher et al. |
| 6,962,258 B2 | 11/2005 | Zha et al. |
| 6,974,554 B2 | 12/2005 | Cox et al. |
| 6,994,867 B1 | 2/2006 | Hossainy et al. |
| 7,005,100 B2 | 2/2006 | Lowell |
| 7,014,763 B2 | 3/2006 | Johnson et al. |
| 7,018,530 B2 | 3/2006 | Pollock |
| 7,022,233 B2 | 4/2006 | Chen |
| 7,041,728 B2 | 5/2006 | Zipplies et al. |
| 7,052,610 B2 | 5/2006 | Janson et al. |
| 7,083,733 B2 | 8/2006 | Freydina et al. |
| 7,087,173 B2 | 8/2006 | Cote et al. |
| 7,122,121 B1 | 10/2006 | Ji |
| 7,147,777 B1 | 12/2006 | Porteous |
| 7,147,778 B1 | 12/2006 | DiMassimo et al. |
| 7,160,455 B2 | 1/2007 | Taniguchi et al. |
| 7,160,463 B2 | 1/2007 | Beck et al. |
| 7,172,699 B1 | 2/2007 | Trivedi et al. |
| 7,172,701 B2 | 2/2007 | Gaid et al. |
| 7,186,344 B2 | 3/2007 | Hughes |

(56) References Cited

U.S. PATENT DOCUMENTS

| | | | |
|---|---|---|---|
| 7,208,091 B2 | 4/2007 | Pind et al. | |
| 7,223,340 B2 | 5/2007 | Zha et al. | |
| 7,226,541 B2 | 6/2007 | Muller et al. | |
| 7,247,238 B2 | 7/2007 | Mullette et al. | |
| 7,264,716 B2 | 9/2007 | Johnson et al. | |
| 7,279,100 B2 | 10/2007 | Devine | |
| 7,279,215 B2 | 10/2007 | Hester et al. | |
| 7,314,563 B2 | 1/2008 | Cho et al. | |
| 7,329,344 B2 | 2/2008 | Jordan et al. | |
| 7,344,645 B2 | 3/2008 | Beck et al. | |
| 7,410,584 B2 | 8/2008 | Devine | |
| 7,455,765 B2 | 11/2008 | Elefritz et al. | |
| 7,481,933 B2 | 1/2009 | Barnes | |
| 7,507,274 B2 | 3/2009 | Tonkovich et al. | |
| 7,510,655 B2 | 3/2009 | Barnes | |
| 7,563,363 B2 | 7/2009 | Kuzma | |
| 7,591,950 B2 | 9/2009 | Zha et al. | |
| 7,632,439 B2 | 12/2009 | Mullette et al. | |
| 7,648,634 B2 | 1/2010 | Probst | |
| 7,662,212 B2 | 2/2010 | Mullette et al. | |
| 7,708,887 B2 | 5/2010 | Johnson et al. | |
| 7,713,413 B2 | 5/2010 | Barnes | |
| 7,718,057 B2 | 5/2010 | Jordan et al. | |
| 7,718,065 B2 | 5/2010 | Jordan | |
| 7,722,769 B2 | 5/2010 | Jordan et al. | |
| 7,761,826 B1 | 7/2010 | Thanvantri et al. | |
| 7,819,956 B2 | 10/2010 | Muller | |
| 7,850,851 B2 | 12/2010 | Zha et al. | |
| 7,931,463 B2 | 4/2011 | Cox et al. | |
| 8,002,246 B2 | 8/2011 | Eguchi et al. | |
| 8,197,688 B2 * | 6/2012 | Sakashita | B01D 63/02 210/321.79 |
| 8,287,923 B2 * | 10/2012 | Hsu | A61K 31/353 424/729 |
| 8,372,282 B2 * | 2/2013 | Zha | B01D 61/18 210/321.69 |
| 8,506,806 B2 * | 8/2013 | Beck | B01D 61/14 210/321.69 |
| 8,518,256 B2 * | 8/2013 | Cox | B01D 63/022 210/321.8 |
| 8,679,337 B2 * | 3/2014 | Ishibashi | B01D 61/18 210/321.6 |
| 2001/0035092 A1 | 11/2001 | Hachimaki et al. | |
| 2001/0052494 A1 | 12/2001 | Cote et al. | |
| 2002/0027111 A1 | 3/2002 | Ando et al. | |
| 2002/0070157 A1 | 6/2002 | Yamada | |
| 2002/0117444 A1 | 8/2002 | Mikkelson et al. | |
| 2002/0148767 A1 | 10/2002 | Johnson et al. | |
| 2002/0153313 A1 | 10/2002 | Cote | |
| 2002/0185435 A1 | 12/2002 | Husain et al. | |
| 2003/0038075 A1 * | 2/2003 | Akimoto | B01D 63/021 210/321.79 |
| 2003/0038080 A1 | 2/2003 | Vriens et al. | |
| 2003/0042199 A1 | 3/2003 | Smith | |
| 2003/0052055 A1 | 3/2003 | Akamatsu et al. | |
| 2003/0056919 A1 | 3/2003 | Beck | |
| 2003/0057155 A1 | 3/2003 | Husain et al. | |
| 2003/0062301 A1 | 4/2003 | Merrie et al. | |
| 2003/0075495 A1 | 4/2003 | Dannstrom et al. | |
| 2003/0075504 A1 | 4/2003 | Zha et al. | |
| 2003/0121855 A1 | 7/2003 | Kopp | |
| 2003/0127388 A1 | 7/2003 | Ando et al. | |
| 2003/0146153 A1 | 8/2003 | Cote et al. | |
| 2003/0159988 A1 | 8/2003 | Daigger et al. | |
| 2003/0173706 A1 * | 9/2003 | Rabie | B01D 63/021 264/261 |
| 2003/0196955 A1 | 10/2003 | Hughes | |
| 2003/0205519 A1 * | 11/2003 | Zha | B01D 63/02 210/321.69 |
| 2003/0226797 A1 | 12/2003 | Phelps | |
| 2004/0007523 A1 | 1/2004 | Gabon et al. | |
| 2004/0007525 A1 | 1/2004 | Rabie et al. | |
| 2004/0035770 A1 | 2/2004 | Edwards et al. | |
| 2004/0045893 A1 | 3/2004 | Watanabe et al. | |
| 2004/0050791 A1 | 3/2004 | Herczeg | |
| 2004/0055974 A1 | 3/2004 | Del Vecchio et al. | |
| 2004/0108268 A1 | 6/2004 | Liu et al. | |
| 2004/0112831 A1 | 6/2004 | Rabie et al. | |
| 2004/0118779 A1 | 6/2004 | Rawson et al. | |
| 2004/0129637 A1 | 7/2004 | Husain et al. | |
| 2004/0149655 A1 | 8/2004 | Petrucco et al. | |
| 2004/0154671 A1 | 8/2004 | Martins et al. | |
| 2004/0168978 A1 | 9/2004 | Gray | |
| 2004/0173525 A1 | 9/2004 | Hunniford et al. | |
| 2004/0178136 A1 * | 9/2004 | Taniguchi | B01D 63/02 210/321.79 |
| 2004/0188339 A1 | 9/2004 | Murkute et al. | |
| 2004/0188341 A1 | 9/2004 | Zha et al. | |
| 2004/0222158 A1 | 11/2004 | Husain et al. | |
| 2004/0232076 A1 | 11/2004 | Zha et al. | |
| 2004/0245174 A1 | 12/2004 | Takayama et al. | |
| 2005/0000885 A1 | 1/2005 | Stockbower | |
| 2005/0006308 A1 | 1/2005 | Cote et al. | |
| 2005/0023219 A1 | 2/2005 | Kirker et al. | |
| 2005/0045557 A1 | 3/2005 | Daigger et al. | |
| 2005/0053878 A1 | 3/2005 | Bruun et al. | |
| 2005/0061725 A1 | 3/2005 | Liu et al. | |
| 2005/0077227 A1 | 4/2005 | Kirker et al. | |
| 2005/0098494 A1 | 5/2005 | Mullette et al. | |
| 2005/0103722 A1 | 5/2005 | Freydina et al. | |
| 2005/0109692 A1 | 5/2005 | Zha et al. | |
| 2005/0115880 A1 | 6/2005 | Pollock | |
| 2005/0115899 A1 | 6/2005 | Liu et al. | |
| 2005/0121389 A1 | 6/2005 | Janson et al. | |
| 2005/0126963 A1 | 6/2005 | Phagoo et al. | |
| 2005/0161389 A1 | 7/2005 | Takeda et al. | |
| 2005/0184008 A1 | 8/2005 | Schacht et al. | |
| 2005/0194305 A1 | 9/2005 | Vido et al. | |
| 2005/0194310 A1 | 9/2005 | Yamamoto et al. | |
| 2005/0194315 A1 | 9/2005 | Adams et al. | |
| 2006/0021929 A1 | 2/2006 | Mannheim et al. | |
| 2006/0033222 A1 | 2/2006 | Godfrey et al. | |
| 2006/0049093 A1 | 3/2006 | Chikura et al. | |
| 2006/0065596 A1 | 3/2006 | Kent et al. | |
| 2006/0081533 A1 | 4/2006 | Khudenko | |
| 2006/0091074 A1 | 5/2006 | Pedersen et al. | |
| 2006/0151373 A1 * | 7/2006 | Szabo | B01D 63/022 210/321.61 |
| 2006/0201879 A1 | 9/2006 | Den Boestert et al. | |
| 2006/0249448 A1 | 11/2006 | Fujishima et al. | |
| 2006/0249449 A1 | 11/2006 | Nakhla et al. | |
| 2006/0273007 A1 | 12/2006 | Zha et al. | |
| 2006/0273038 A1 | 12/2006 | Syed et al. | |
| 2007/0039888 A1 | 2/2007 | Ginzburg et al. | |
| 2007/0045183 A1 | 3/2007 | Murphy | |
| 2007/0051679 A1 | 3/2007 | Adams et al. | |
| 2007/0075017 A1 | 4/2007 | Kuzma | |
| 2007/0084791 A1 | 4/2007 | Jordan et al. | |
| 2007/0084795 A1 | 4/2007 | Jordan | |
| 2007/0095741 A1 | 5/2007 | Berends | |
| 2007/0102339 A1 | 5/2007 | Cote et al. | |
| 2007/0108125 A1 | 5/2007 | Cho et al. | |
| 2007/0138090 A1 | 6/2007 | Jordan et al. | |
| 2007/0163942 A1 | 7/2007 | Tanaka et al. | |
| 2007/0170112 A1 | 7/2007 | Elefritz et al. | |
| 2007/0181496 A1 | 8/2007 | Zuback | |
| 2008/0011675 A1 * | 1/2008 | Kedziora | B01D 63/022 210/500.23 |
| 2008/0093297 A1 | 4/2008 | Gock et al. | |
| 2008/0179249 A1 | 7/2008 | Beck et al. | |
| 2008/0203017 A1 | 8/2008 | Zha et al. | |
| 2008/0257822 A1 | 10/2008 | Johnson | |
| 2008/0277340 A1 | 11/2008 | Hong et al. | |
| 2009/0001018 A1 | 1/2009 | Zha et al. | |
| 2009/0194477 A1 | 8/2009 | Hashimoto | |
| 2010/0012585 A1 | 1/2010 | Zha et al. | |
| 2010/0025320 A1 | 2/2010 | Johnson | |
| 2010/0051545 A1 | 3/2010 | Johnson et al. | |
| 2010/0170847 A1 | 7/2010 | Zha et al. | |
| 2010/0200503 A1 | 8/2010 | Zha et al. | |
| 2010/0300968 A1 | 12/2010 | Liu et al. | |
| 2010/0326906 A1 | 12/2010 | Barnes | |
| 2011/0049047 A1 | 3/2011 | Cumin et al. | |

(56) References Cited

U.S. PATENT DOCUMENTS

| | | | |
|---|---|---|---|
| 2011/0049048 A1 | 3/2011 | Benner et al. | |
| 2011/0056522 A1 | 3/2011 | Zauner et al. | |
| 2011/0127209 A1 | 6/2011 | Rogers et al. | |
| 2011/0132826 A1 | 6/2011 | Muller et al. | |
| 2011/0139715 A1 | 6/2011 | Zha et al. | |
| 2011/0147298 A1 | 6/2011 | Kennedy et al. | |
| 2011/0192783 A1 | 8/2011 | Cox et al. | |
| 2012/0074053 A1 | 3/2012 | Collignon et al. | |
| 2012/0091602 A1 | 4/2012 | Cumin et al. | |
| 2012/0097601 A1 | 4/2012 | Lee et al. | |
| 2012/0285885 A1 | 11/2012 | James et al. | |
| 2013/0037467 A1 | 2/2013 | Biltoft et al. | |
| 2013/0056426 A1 | 3/2013 | Barnes | |
| 2013/0168307 A1 | 7/2013 | Drivarbekk et al. | |
| 2015/0136686 A1* | 5/2015 | Chen | A01G 25/023 210/459 |

FOREIGN PATENT DOCUMENTS

| | | |
|---|---|---|
| AU | 762091 B2 | 6/2003 |
| CA | 2531764 A1 | 3/2005 |
| CN | 2204898 Y | 8/1995 |
| CN | 2236049 Y | 9/1996 |
| CN | 1541757 A | 11/2004 |
| DE | 3904544 A1 | 8/1990 |
| DE | 4117281 A1 | 1/1992 |
| DE | 4113420 A1 | 10/1992 |
| DE | 4117422 C1 | 11/1992 |
| DE | 4326603 A1 | 2/1995 |
| DE | 19503060 A1 | 8/1996 |
| DE | 19718028 C1 | 6/1998 |
| DE | 29804927 U1 | 6/1998 |
| DE | 29906389 U1 | 6/1999 |
| DE | 10045227 C1 | 2/2002 |
| DE | 10209170 C1 | 8/2003 |
| DE | 202004012693 U1 | 10/2004 |
| EP | 0012557 A1 | 6/1980 |
| EP | 0050447 A1 | 4/1982 |
| EP | 0053833 A2 | 6/1982 |
| EP | 0090383 A2 | 10/1983 |
| EP | 126714 A2 | 11/1984 |
| EP | 194735 A2 | 9/1986 |
| EP | 250337 A1 | 12/1987 |
| EP | 327025 A1 | 8/1989 |
| EP | 344633 A1 | 12/1989 |
| EP | 407900 A2 | 1/1991 |
| EP | 0464321 A1 | 1/1992 |
| EP | 492942 A2 | 7/1992 |
| EP | 518250 B1 | 12/1992 |
| EP | 547575 A1 | 6/1993 |
| EP | 280052 A1 | 7/1994 |
| EP | 627255 A1 | 12/1994 |
| EP | 395133 A1 | 2/1995 |
| EP | 662341 A1 | 7/1995 |
| EP | 492446 B1 | 11/1995 |
| EP | 430082 B1 | 6/1996 |
| EP | 734758 A1 | 10/1996 |
| EP | 763758 A1 | 3/1997 |
| EP | 824956 A2 | 2/1998 |
| EP | 848194 A2 | 6/1998 |
| EP | 911073 A1 | 4/1999 |
| EP | 920904 A2 | 6/1999 |
| EP | 0937494 A2 | 8/1999 |
| EP | 1034835 A1 | 9/2000 |
| EP | 1156015 A1 | 11/2001 |
| EP | 1236503 A1 | 8/2004 |
| EP | 1466658 A1 | 10/2004 |
| EP | 0038612 B1 * | 2/2008 |
| FR | 2620712 A1 | 3/1989 |
| FR | 2674448 A1 | 10/1992 |
| FR | 2699424 A1 | 6/1994 |
| FR | 2762834 A1 | 11/1998 |
| GB | 702911 A | 1/1954 |
| GB | 996195 A | 6/1965 |
| GB | 2253572 A | 9/1992 |
| JP | 52-078677 A | 7/1977 |
| JP | 53-5077 | 1/1978 |
| JP | 53108882 A | 9/1978 |
| JP | 54162684 A | 12/1979 |
| JP | 55099703 A | 7/1980 |
| JP | 55129107 A | 10/1980 |
| JP | 55129155 A | 10/1980 |
| JP | 56021604 A | 2/1981 |
| JP | 56118701 A | 9/1981 |
| JP | 56121685 A | 9/1981 |
| JP | 57190697 A | 11/1982 |
| JP | 58088007 A | 5/1983 |
| JP | 60019002 A | 1/1985 |
| JP | 60206412 A | 10/1985 |
| JP | 60260628 A | 12/1985 |
| JP | 61097005 A | 5/1986 |
| JP | 61097006 A | 5/1986 |
| JP | 61107905 A | 5/1986 |
| JP | 61167406 A | 7/1986 |
| JP | 61167407 A | 7/1986 |
| JP | 61171504 A | 8/1986 |
| JP | 61192309 A | 8/1986 |
| JP | 61222510 A | 10/1986 |
| JP | 61242607 A | 10/1986 |
| JP | 61249505 A | 11/1986 |
| JP | 61257203 A | 11/1986 |
| JP | 61263605 A | 11/1986 |
| JP | 61291007 A | 12/1986 |
| JP | 61293504 A | 12/1986 |
| JP | 62004408 A | 1/1987 |
| JP | 62068828 A | 3/1987 |
| JP | 62114609 A | 5/1987 |
| JP | 62140607 A | 6/1987 |
| JP | 62144708 A | 6/1987 |
| JP | 62163708 A | 7/1987 |
| JP | 62179540 A | 8/1987 |
| JP | 62237908 A | 10/1987 |
| JP | 62250908 A | 10/1987 |
| JP | 62187606 | 11/1987 |
| JP | 62262710 A | 11/1987 |
| JP | 63-93307 | 4/1988 |
| JP | 63097634 A | 4/1988 |
| JP | 63099246 A | 4/1988 |
| JP | 63143905 A | 6/1988 |
| JP | 63-1602 | 7/1988 |
| JP | 63171607 A | 7/1988 |
| JP | 63180254 A | 7/1988 |
| JP | S63-38884 | 10/1988 |
| JP | 64-075542 A | 3/1989 |
| JP | 1-501046 T | 4/1989 |
| JP | 1111494 A | 4/1989 |
| JP | 01151906 A | 6/1989 |
| JP | 01-307409 A | 12/1989 |
| JP | 02-017925 | 1/1990 |
| JP | 02017924 | 1/1990 |
| JP | 02026625 A | 1/1990 |
| JP | 02031200 A | 2/1990 |
| JP | 02040296 A | 2/1990 |
| JP | 02107318 A | 4/1990 |
| JP | 02126922 A | 5/1990 |
| JP | 02144132 A | 6/1990 |
| JP | 02164423 A | 6/1990 |
| JP | 02174918 A | 7/1990 |
| JP | 02241523 A | 9/1990 |
| JP | 02277528 A | 11/1990 |
| JP | 02284035 A | 11/1990 |
| JP | 03018373 A | 1/1991 |
| JP | 03028797 A | 2/1991 |
| JP | 03-086529 A | 4/1991 |
| JP | 03110445 A | 5/1991 |
| JP | 04108518 A | 4/1992 |
| JP | 04110023 A | 4/1992 |
| JP | 4-190889 A | 7/1992 |
| JP | 04187224 A | 7/1992 |
| JP | 4-256425 A | 9/1992 |
| JP | 04250898 A | 9/1992 |
| JP | 04256424 A | 9/1992 |
| JP | 04265128 A | 9/1992 |

(56) References Cited

FOREIGN PATENT DOCUMENTS

| | | |
|---|---|---|
| JP | 04293527 A | 10/1992 |
| JP | 04310223 A | 11/1992 |
| JP | 04317793 A | 11/1992 |
| JP | 04334530 A | 11/1992 |
| JP | 04348252 A | 12/1992 |
| JP | 05-4030 | 1/1993 |
| JP | 05023557 A | 2/1993 |
| JP | 05096136 A | 4/1993 |
| JP | 05137977 A | 6/1993 |
| JP | 05157654 A | 6/1993 |
| JP | 05161831 A | 6/1993 |
| JP | 05184884 A | 7/1993 |
| JP | 05285348 A | 11/1993 |
| JP | 05305221 A | 11/1993 |
| JP | 06-027215 A | 2/1994 |
| JP | 06071120 A | 3/1994 |
| JP | 06114240 A | 4/1994 |
| JP | 06170364 A | 6/1994 |
| JP | 06190250 A | 7/1994 |
| JP | 06218237 A | 8/1994 |
| JP | 06238273 A | 8/1994 |
| JP | 06-292820 A | 10/1994 |
| JP | 06277469 A | 10/1994 |
| JP | 06285496 A | 10/1994 |
| JP | 06343837 A | 12/1994 |
| JP | 07000770 A | 1/1995 |
| JP | 07024272 A | 1/1995 |
| JP | 07068139 A | 3/1995 |
| JP | 07136470 A | 5/1995 |
| JP | 07136471 A | 5/1995 |
| JP | 07155564 A | 6/1995 |
| JP | 07155758 A | 6/1995 |
| JP | 7-39921 | 7/1995 |
| JP | 07178323 A | 7/1995 |
| JP | 07185268 A | 7/1995 |
| JP | 07185270 A | 7/1995 |
| JP | 07185271 A | 7/1995 |
| JP | 07185272 A | 7/1995 |
| JP | 07204635 A | 8/1995 |
| JP | 07236819 A | 9/1995 |
| JP | 07251043 A | 10/1995 |
| JP | 07256253 | 10/1995 |
| JP | 07275665 A | 10/1995 |
| JP | 07289860 A | 11/1995 |
| JP | 07303895 A | 11/1995 |
| JP | 07313973 A | 12/1995 |
| JP | 08010585 A | 1/1996 |
| JP | 8039089 A | 2/1996 |
| JP | 08197053 A | 8/1996 |
| JP | 08323161 A | 12/1996 |
| JP | 08332357 A | 12/1996 |
| JP | 09000890 A | 1/1997 |
| JP | 09038470 A | 2/1997 |
| JP | 09038648 A | 2/1997 |
| JP | 09072993 A | 3/1997 |
| JP | 09075689 A | 3/1997 |
| JP | 09099227 A | 4/1997 |
| JP | 09103655 A | 4/1997 |
| JP | 09103661 A | 4/1997 |
| JP | 9117647 A | 5/1997 |
| JP | 9138298 A | 5/1997 |
| JP | 09141063 A | 6/1997 |
| JP | 09155345 A | 6/1997 |
| JP | 09187628 A | 7/1997 |
| JP | 09192458 A | 7/1997 |
| JP | 09220569 A | 8/1997 |
| JP | 09271641 A | 10/1997 |
| JP | 09313902 A | 12/1997 |
| JP | 09324067 A | 12/1997 |
| JP | 10015365 A | 1/1998 |
| JP | 10024222 A | 1/1998 |
| JP | 10033955 A | 2/1998 |
| JP | 10048466 A | 2/1998 |
| JP | 10066972 A | 3/1998 |
| JP | 10076144 A | 3/1998 |
| JP | 10076264 A | 3/1998 |
| JP | 10085562 A | 4/1998 |
| JP | 10085565 A | 4/1998 |
| JP | 10085566 A | 4/1998 |
| JP | 10156149 A | 6/1998 |
| JP | 10180048 A | 7/1998 |
| JP | 10225685 A | 8/1998 |
| JP | 10235168 A | 9/1998 |
| JP | 10249171 A | 9/1998 |
| JP | 10286441 A | 10/1998 |
| JP | 10328538 A | 12/1998 |
| JP | 11005023 A | 1/1999 |
| JP | 11028339 A | 2/1999 |
| JP | 11028467 A | 2/1999 |
| JP | 11031025 A | 2/1999 |
| JP | 11033365 A | 2/1999 |
| JP | 11033367 A | 2/1999 |
| JP | 11076769 A | 3/1999 |
| JP | 11076770 A | 3/1999 |
| JP | 11090189 A | 4/1999 |
| JP | 11156166 A | 6/1999 |
| JP | 11156360 A | 6/1999 |
| JP | 11165200 A | 6/1999 |
| JP | 11179171 A | 7/1999 |
| JP | 11300177 A | 11/1999 |
| JP | 11302438 A | 11/1999 |
| JP | 11309351 A | 11/1999 |
| JP | 11319501 A | 11/1999 |
| JP | 11319507 A | 11/1999 |
| JP | 11333265 A | 12/1999 |
| JP | 2000000439 A | 1/2000 |
| JP | 200051670 | 2/2000 |
| JP | 2000051669 A | 2/2000 |
| JP | 2000061466 A | 2/2000 |
| JP | 200079390 A | 3/2000 |
| JP | 2000070684 A | 3/2000 |
| JP | 2000093758 | 4/2000 |
| JP | 2000157850 A | 6/2000 |
| JP | 2000185220 A | 7/2000 |
| JP | 2000189958 A | 7/2000 |
| JP | 2000157845 | 8/2000 |
| JP | 2000233020 A | 8/2000 |
| JP | 2000237548 A | 9/2000 |
| JP | 2000300968 A | 10/2000 |
| JP | 2000317276 A | 11/2000 |
| JP | 2000334276 A | 12/2000 |
| JP | 2000342932 A | 12/2000 |
| JP | 2001009246 A | 1/2001 |
| JP | 2001070967 A | 3/2001 |
| JP | 2001079366 A | 3/2001 |
| JP | 2001079367 A | 3/2001 |
| JP | 2001104760 A | 4/2001 |
| JP | 2001120963 A | 5/2001 |
| JP | 2001179059 A | 7/2001 |
| JP | 2001179060 A | 7/2001 |
| JP | 2001190937 A | 7/2001 |
| JP | 2001190938 A | 7/2001 |
| JP | 2001205055 A | 7/2001 |
| JP | 2001212587 A | 8/2001 |
| JP | 2001232160 A | 8/2001 |
| JP | 2001-269546 | 10/2001 |
| JP | 2002011472 | 1/2002 |
| JP | 2002143849 A | 5/2002 |
| JP | 2002177746 A | 6/2002 |
| JP | 2002263407 A | 9/2002 |
| JP | 2002-336663 | 11/2002 |
| JP | 2003024751 | 1/2003 |
| JP | 2003047830 | 2/2003 |
| JP | 2003053157 A | 2/2003 |
| JP | 2003053160 A | 2/2003 |
| JP | 200371254 A | 3/2003 |
| JP | 2003062436 A | 3/2003 |
| JP | 2003135935 A | 5/2003 |
| JP | 2003190976 A | 7/2003 |
| JP | 2003-265597 | 9/2003 |
| JP | 2003-275548 | 9/2003 |
| JP | 2003266072 A | 9/2003 |
| JP | 2003275759 A | 9/2003 |
| JP | 2003340250 A | 12/2003 |

(56) References Cited

FOREIGN PATENT DOCUMENTS

| | | |
|---|---|---|
| JP | 2004008981 | 1/2004 |
| JP | 2004050011 A | 2/2004 |
| JP | 2004073950 A | 3/2004 |
| JP | 2004-230287 A | 8/2004 |
| JP | 2004216263 A | 8/2004 |
| JP | 2004230280 A | 8/2004 |
| JP | 2004249168 A | 9/2004 |
| JP | 2004322100 A | 11/2004 |
| JP | 2004337730 A | 12/2004 |
| JP | 2005-087887 A | 4/2005 |
| JP | 2005144291 A | 6/2005 |
| JP | 2005154551 A | 6/2005 |
| JP | 2005279447 A | 10/2005 |
| JP | 2006116495 | 5/2006 |
| JP | 2007547083 | 8/2010 |
| KR | 20-0232145 | 7/2001 |
| KR | 1020020067227 | 8/2002 |
| KR | 20-0295350 | 11/2002 |
| KR | 2002-0090967 | 12/2002 |
| KR | 2003-033812 | 5/2003 |
| KR | 2003-060625 | 7/2003 |
| KR | 20030066271 | 8/2003 |
| KR | 20030097167 | 12/2003 |
| KR | 2005-063478 | 6/2005 |
| NL | 1006390 C2 | 12/1998 |
| NL | 1020491 C | 10/2003 |
| NL | 1021197 C | 10/2003 |
| TW | 216773 B | 12/1993 |
| TW | 347343 | 12/1998 |
| WO | 8501449 A1 | 4/1985 |
| WO | 8605116 A1 | 9/1986 |
| WO | 8605705 A1 | 10/1986 |
| WO | 8800494 A1 | 1/1988 |
| WO | 8801529 A1 | 3/1988 |
| WO | 88001895 A1 | 3/1988 |
| WO | 8806200 A1 | 8/1988 |
| WO | 8900880 A1 | 2/1989 |
| WO | 9000434 A1 | 1/1990 |
| WO | 9104783 A1 | 4/1991 |
| WO | 9116124 A1 | 10/1991 |
| WO | 9302779 A1 | 2/1993 |
| WO | 9315827 A1 | 8/1993 |
| WO | 9323152 A1 | 11/1993 |
| WO | 9411094 A1 | 5/1994 |
| WO | 9511736 A1 | 5/1995 |
| WO | 9534424 A1 | 12/1995 |
| WO | 9603202 A1 | 2/1996 |
| WO | 9607470 A1 | 3/1996 |
| WO | 9628236 A1 | 9/1996 |
| WO | 9629142 A1 | 9/1996 |
| WO | 9641676 A1 | 12/1996 |
| WO | 9706880 A2 | 2/1997 |
| WO | 9710046 A1 | 3/1997 |
| WO | 9822204 A1 | 5/1998 |
| WO | 9825694 A1 | 6/1998 |
| WO | 9828066 A1 | 7/1998 |
| WO | 9853902 A1 | 12/1998 |
| WO | 9901207 A1 | 1/1999 |
| WO | 9906326 A1 | 2/1999 |
| WO | 9908773 A1 | 2/1999 |
| WO | 99-55448 A1 | 11/1999 |
| WO | 9959707 A1 | 11/1999 |
| WO | 0018498 A1 | 4/2000 |
| WO | 0021890 A1 | 4/2000 |
| WO | 0030740 A1 | 6/2000 |
| WO | 0030742 A1 | 6/2000 |
| WO | 0100307 A2 | 1/2001 |
| WO | 0105715 A1 | 1/2001 |
| WO | 0108790 A1 | 2/2001 |
| WO | 0119414 A1 | 3/2001 |
| WO | 0132299 A1 | 5/2001 |
| WO | 0136075 A1 | 5/2001 |
| WO | 0143856 A1 | 6/2001 |
| WO | 0145829 A1 | 6/2001 |
| WO | 0204100 | 1/2002 |
| WO | 0211867 A1 | 2/2002 |
| WO | 0226363 A2 | 4/2002 |
| WO | 0230550 A1 | 4/2002 |
| WO | 0238256 A1 | 5/2002 |
| WO | 0240140 A1 | 5/2002 |
| WO | 0247800 A1 | 6/2002 |
| WO | 03000389 A2 | 1/2003 |
| WO | 03013706 A1 | 2/2003 |
| WO | 03024575 A1 | 3/2003 |
| WO | 03053552 A1 | 7/2003 |
| WO | 03057632 A1 | 7/2003 |
| WO | 03059495 A1 | 7/2003 |
| WO | 03068374 A1 | 8/2003 |
| WO | 03095078 A1 | 11/2003 |
| WO | 2004018084 A1 | 3/2004 |
| WO | 2004024304 A2 | 3/2004 |
| WO | 2004033078 A1 | 4/2004 |
| WO | 2004050221 A1 | 6/2004 |
| WO | 2004056458 A3 | 7/2004 |
| WO | 2004078327 A1 | 9/2004 |
| WO | 2004101120 A1 | 11/2004 |
| WO | 2005005028 A1 | 1/2005 |
| WO | 2005021140 A1 | 3/2005 |
| WO | 2005023997 A1 | 3/2005 |
| WO | 2005028085 A1 | 3/2005 |
| WO | 2005028086 A1 | 3/2005 |
| WO | 2005037414 A1 | 4/2005 |
| WO | 2005046849 A1 | 5/2005 |
| WO | 2005070524 A1 | 8/2005 |
| WO | 2005077499 A1 | 8/2005 |
| WO | 2005082498 A1 | 9/2005 |
| WO | 2005107929 A2 | 11/2005 |
| WO | 2006017911 A1 | 2/2006 |
| WO | 2006026814 A1 | 3/2006 |
| WO | 2006029456 A1 | 3/2006 |
| WO | 2006029465 | 3/2006 |
| WO | 2006047814 A1 | 5/2006 |
| WO | 2006066319 A1 | 6/2006 |
| WO | 2006066350 A1 | 6/2006 |
| WO | 2006126833 A1 | 11/2006 |
| WO | 2007022576 A1 | 3/2007 |
| WO | 2007053528 A2 | 5/2007 |
| WO | 2007065956 A1 | 6/2007 |
| WO | 2007073080 A1 | 6/2007 |
| WO | 2007135087 A1 | 11/2007 |
| WO | 2008025077 A1 | 3/2008 |
| WO | 2008034570 A1 | 3/2008 |
| WO | 2008071516 A1 | 6/2008 |
| WO | 2008141080 A1 | 11/2008 |
| WO | 2008153818 A1 | 12/2008 |
| WO | 2009030405 A1 | 3/2009 |

OTHER PUBLICATIONS

Almulla et al., "Developments in high recovery brackish water desalination plants as part of the solution to water quantity problems," Desalination, 153 (2002), pp. 237-243.
Anonymous, "Nonwoven Constructions of Dyneon™ THV and Dyneon™ HTE Fluorothermoplastics", Research Disclosure Journal, Apr. 1999, RD 420013, 2 pages.
Cote et al. "A New Immersed Membrane for Pretreatment to Reverse Osmosis," Desalination, 139 (2001), pp. 229-236.
Cote et al., "Immersed Membranes Activated Sludge Process Applied to the Treatment of Municipal Wastewater," Wat. Sci. Tech. 38(4-5) (1998), pp. 437-442.
Coulson et al., "Coulson and Richardson's Chemical Engineering," 1999, vol. 1, pp. 358-364.
Crawford et al., American Water Works Association Membrane Technology Conference, "Procurement of Membrane Equipment: Differences Between Water Treatment and Membrane Bioreactor (MBR) Applications," (2003).
Cui et al., "Airlift crossflow membrane filtration—a feasibility study with dextran ultrafiltration," J. Membrane Sci. (1997) vol. 128, pp. 83-91.
Davis et al., Membrane Technology Conference, "Membrane Bioreactor Evaluation for Water Reuse in Seattle, Washington" (2003).

(56) References Cited

OTHER PUBLICATIONS

DeCarolis et al., Membrane Technology Conference, "Optimization of Various MBR Systems for Water Reclamation" (2003).

Delgrange-Vincent et al., "Neural networks for long term prediction of fouling and backwash efficiency in ultrafiltration for drinking water production," Desalination 131 (2000) pp. 353-362.

Dow Chemical Company, "Filmtec Membranes—Cleaning Procedures for Filmtec FT30 Elements," Tech Facts, Online, Jun. 30, 2000, XP002237568.

EPA, Membrane Filtration Guidance Manual, Nov. 2005.

Husain, H. et al., "The ZENON experience with membrane bioreactors for municipal wastewater treatment," MBR2: Membr. Bioreact. Wastewater Treat., 2nd Intl. Meeting; School of Water Sciences, Cranfield University, Cranfield, UK, Jun. 1999.

Johnson, "Recent Advances in Microfiltration for Drinking Water Treatment," AWWA Annual Conference, Jun. 20-24, 1999, Chicago, Illinois, entire publication.

Jones, Craig, "Applications of Hydrogen Peroxide and Derivatives," The Royal Society of Chemistry, Cambridge, UK 1999, Chapters 2 and 5.

Judd, "The MBR Book: Principles and Applications of Membrane Bioreactors in Water and Wastewater Treatment," (2006), pp. 174-178.

Kaiya et al., "Water Purification Using Hollow Fiber Microfiltration Membranes," 6th World Filtration Congress, Nagoya, 1993, pp. 813-816.

Kang et al. "Characteristics of microfiltration membranes in a membrane coupled sequencing batch reactor system," Water Research, 37(5) Mar. 2003, pp. 1192-1197, Elsevier, Amsterdam, NL.

Lloyd, D.R. et al. "Microporous Membrane Formation Via Thermally Induced Phase Separation/Solid-Liquid Phase Separation," Journal of Membrane Science, 52(3) (1990), pp. 239-261, Elsevier Scientific Publishing Company, Amsterdam, NL.

Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.

Mark et al., "Peroxides and Peroxy Compounds, Inorganic," Kirk—Othmer Encyclopedia of Chemical Technology, Peroxides and Peroxy Compounds, Inorganic, to Piping Systems, New York, Wiley & Sons, Ed., Jan. 1, 1978, pp. 14-18.

MicroCTM—Carbon Source for Wastewater Denitrification. Information from Environmental Operating Solutions website including MSDS.

Miller et al., "Side Stream Air Lift MBR Development and Successful Application of a New Generation of MBR," Pollution Solutions Brochure, NORIT, The Netherlands, Apr. 2008.

Nakayama, "Introduction to Fluid Mechanics," Butterworth-Heinemann, Oxford, UK, 2000.

Ramaswammy S. et al. "Fabrication of Ply (ECTFE) Membranes via Thermally Induced Phase Separation", Journal.

Rosenberger et al., "Filterability of activated sludge in membrane bioreactors," Desalination, 151 (2002), pp. 195-200.

Schematic of 4" Geyser Pump, Geyser Pump Tech. Co., Nov. 13, 2005.

U.S. Appl. No. 60/278,007, filed Mar. 23, 2001.

Ueda et al., "Effects of Aeration on Suction Pressure in a Submerged Membrane Bioreactor," Wat. Res. vol. 31, No. 3, 1997, pp. 489-494.

Water Encyclopedia, edited by Jay Lehr, published by John Wiley & Sons, Inc., Hoboken, New Jersey, 2005. Available at http://wwwmmrw.interscience.wiley.com/eow/.

White et al., "Optimisation of intermittently operated microfiltration processes," The Chemical Engineering Journal, 52 (1993), pp. 73-77.

Wikipedia, "Seawater," available at http://en.wikipedia.org/wiki/Seawater, Jul. 15, 2007.

Yamamoto et al., "Direct Solid-Liquid Separation Using Hollow Fiber Membrane in an Activated Sludge Aeration Tank," Water Science Technology, 21 (1989), pp. 43-54.

Yoon: "Important operational parameters of membrane bioreactor-sludge disintegration (MBR-SD) system for zero excess sludge production" Water Research, 37 (2003), pp. 1921-1931, Elsevier, Amsterdam, NL.

Zenon, "Proposal for ZeeWeed® Membrane Filtration Equipment System for the City of Westminster, Colorado, Proposal No. 479-99," Mar. 2000, entire publication.

\* cited by examiner ure and to which this application claims the benefit of priority.

POTTING METHOD

CROSS REFERENCE TO RELATED APPLICATIONS

This application is U.S. national stage application and claims the benefit under 35 U.S.C. §371 of International Application No. PCT/US2013/47848, filed on Jun. 26, 2013, titled A POTTING METHOD, which claims priority to Australian Patent Application No. 2012902751, filed on Jun. 28, 2012, titled A POTTING METHOD, each of which is entirely incorporated herein by reference for all purposes, and to which this application claims the benefit of priority.

BACKGROUND

1. Technical Field

Aspects and embodiments disclosed herein relate to filtration membrane modules including porous membranes and to methods and structures associated with potting ends of the porous membranes in the membrane modules.

2. Discussion of Related Art

Membrane filtration devices are used to separate particles, solids, and micro-organisms from liquids such as water. In membrane filtration devices, the liquid is driven through the membrane, while the particles are excluded from passing through the membrane, largely on the basis of size. The driving force for moving liquid through the membrane is typically fluid pressure, with the membrane pores excluding the particles from passing through the membrane wall.

A barrier is typically formed between an incoming liquid stream to be filtered, typically referred to as feed, and the filtered liquid stream, typically referred to as filtrate by sealing the ends of a porous hollow membrane in a module pot. To accomplish effective filtration it is typically desirable that the integrity of the barrier is maintained. Any compromise of the barrier integrity may result in undesirable contamination of the filtrate stream.

SUMMARY

According to one aspect, there is provided a method of producing a porous membrane having a potted end. The method comprises potting the porous membrane in a first pot to produce a pre-pot and securing the pre-pot in a second pot to produce the porous membrane having the potted end. Producing the pre-pot may comprise positioning at least a portion of the porous membrane in a first mold having a first passage forming formation therein, filling the first mold with a first pot forming substance, curing the first pot forming substance, and separating the cured first pot forming substance from the first mold and first passage forming formation. Producing the pre-pot secured in the second pot may comprise positioning at least a portion of the pre-pot in a second mold having a second passage forming formation therein, filling the second mold with a second pot forming substance, curing the second pot forming substance, and separating the cured second pot forming substance from the second mold and second passage forming formation.

In some embodiments, positioning of the pre-pot in the second mold provides for contact between the second pot forming substance and the pre-pot.

In some embodiments, an annular disc is provided for positioning the pre-pot in the second mold.

According to another aspect, there is provided a potting assembly for potting an end of a porous membrane. The assembly comprises means for producing a pre-potted end of the porous membrane. The means for producing a pre-potted end of the porous membrane comprises means for positioning at least a portion of the porous membrane in a first mold having a first passage forming formation therein, means for filling the first mold with a first pot forming substance, and means for separating the first pot forming substance from the first mold and first passage forming formation. The assembly further comprises means for producing a second potted end of the porous membrane. The means for producing a second potted end of the porous membrane comprises means for positioning at least a portion of the pre-potted end of the porous membrane in a second mold having a second passage forming formation therein, means for filling the second mold with a second pot forming substance, and means for separating the second pot forming substance from the second mold and second passage forming formation.

In some embodiments, the cross-sectional area of the second passage forming formation is smaller than the cross-sectional area of the first passage forming formation.

In some embodiments, the first mold is statically filled with the first pot forming substance and the second mold is centrifugally filled with the second pot forming substance.

In some embodiments, the second pot encapsulates the pre-pot.

In some embodiments, the first and second pot forming substances comprise the same substance.

In some embodiments, the first and second pot forming substances comprise resins.

In some embodiments, the porous membrane comprises a hollow fiber membrane.

In some embodiments, the means for positioning the pre-pot in the second mold provides for contact between the second pot forming substance and the pre-pot.

In some embodiments, the means for positioning the pre-pot in the second mold comprises an annular disc.

According to another aspect, there is provided a porous membrane having a potted end produced by the method as described above.

According to another aspect, there is provided a method of forming a filtration module. The method comprises positioning a portion of a porous membrane in a first potting mold, introducing a first pot forming substance into the first potting mold, the first pot forming substance surrounding the portion of the porous membrane, curing the first pot forming substance to form a pre-pot, separating the pre-pot from the first potting mold, positioning at least a portion of the pre-pot in a second potting mold, introducing a second pot forming substance into the second potting mold, the second pot forming substance surrounding at least a portion of the pre-pot and at least a portion of the porous membrane, curing the second pot forming substance to form a membrane pot, and separating the membrane pot from the second potting mold.

In some embodiments, the method further comprises forming an aperture in the pre-pot.

In some embodiments, forming the aperture in the pre-pot comprises forming the aperture in the pre-pot with a finger member extending upwardly from a base of the first potting mold.

In some embodiments, the method further comprises positioning an annular disc including a plurality of apertures in the first potting mold prior to introducing the first pot forming substance into the first potting mold and introducing a sufficient amount of the first pot forming substance into the first potting mold to cover at least a portion of an inner circumference of the annular disc with the first pot forming substance.

In some embodiments, separating the pre-pot from the first mold comprises pushing the pre-pot out of the first mold with a de-molding device disposed in the base of the first mold.

In some embodiments, the method further comprises forming an aperture in the second pot forming substance.

In some embodiments, forming the aperture in the second pot forming substance comprises forming the aperture in the second pot forming substance coaxial with the aperture formed in the pre-pot.

In some embodiments, forming the aperture in the second pot forming substance comprises forming the aperture in the second pot forming substance with a cross sectional area less than a cross sectional area of the aperture formed in the pre-pot.

In some embodiments, forming the aperture in the second pot forming substance comprises forming the aperture in the second pot forming substance with a finger member extending upwardly from a base of the second potting mold.

In some embodiments, the method further comprises disposing a peripheral region of an outer circumferential portion of the annular disc in a supporting grove defined in a side wall of the second mold.

In some embodiments, the method further comprises coupling a membrane shell to the membrane pot, the membrane shell surrounding at least a portion of the porous membrane.

According to another aspect, there is provided a method of forming a filtration module. The method comprises positioning at least a portion of a porous membrane in a first mold having a first passage forming formation therein, at least partially filling the first mold with a first pot forming substance, curing the first pot forming substance, separating the cured first pot forming substance from the first mold and first passage forming formation to form a pre-pot, positioning at least a portion of the pre-pot in a second mold having a second passage forming formation therein, at least partially filling the second mold with a second pot forming substance, curing the second pot forming substance, and separating the cured second pot forming substance from the second mold and second passage forming formation.

In some embodiments, the method further comprises providing the second passage forming formation with a cross-sectional area smaller than a cross-sectional area of the first passage forming formation.

In some embodiments, the first mold is statically filled with the first pot forming substance.

In some embodiments, the second mold is centrifugally filled with the second pot forming substance.

In some embodiments, filling the second mold with the second pot forming substance comprises filling the second mold with a sufficient quantity of the second pot forming substance such that the second pot forming substance encapsulates the pre-pot.

In some embodiments, filling the first mold with the first pot forming substance and filling the second mold with the second pot forming substance comprises filling the first mold and the second mold with the same substance.

In some embodiments, filling the first mold with the first pot forming substance and filling the second mold with the second pot forming substance comprises filling the first mold and the second mold with the different substances.

In some embodiments, the method further comprises sealing an annular disc in the pre-pot.

In some embodiments, the method further comprises positioning the pre-pot in the second mold by disposing a portion of the annular disc in a supporting grove defined in a side wall of the second mold.

According to another aspect, there is provided a membrane filtration module. The membrane filtration module comprises a porous membrane having an end secured in a pre-pot formed of a first potting material and at least partially enclosed in a second potting material, an annular disc having an internal circumferential portion secured in the first potting material and an external circumferential portion in contact with the second potting material, and a membrane shell coupled to the second potting material and in contact with the external circumferential portion of the annular disc, the membrane shell surrounding at least a portion of the porous membrane.

In some embodiments, the membrane filtration module further comprises at least one aperture defined in the pre-pot.

In some embodiments, the membrane filtration module further comprises an aperture defined in the second potting material and disposed within the at least one aperture defined in the pre-pot.

In some embodiments, the first potting material is a same material as the second potting material.

In some embodiments, the first potting material is a different material than the second potting material.

According to another aspect, there is provided a system for potting a porous filtration membrane. The system comprises a first mold configured to form a pre-pot and a second mold configured to receive the pre-pot formed in the first mold. The first mold includes a first side wall, a first base plate coupled to the first side wall, and a first passage forming formation coupled to the first base plate. The second mold includes a second side wall, a second base plate coupled to the second side wall, and a second passage forming formation coupled to the second base plate.

In some embodiments, a cross sectional area of the second passage forming formation is smaller than a cross sectional area of the first passage forming formation.

In some embodiments, the system further comprises a de-molding device coupled to one of the first base plate and the second base plate.

In some embodiments, the system further comprises an annular disc configured and arranged to position and secure the pre-pot in the second mold.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
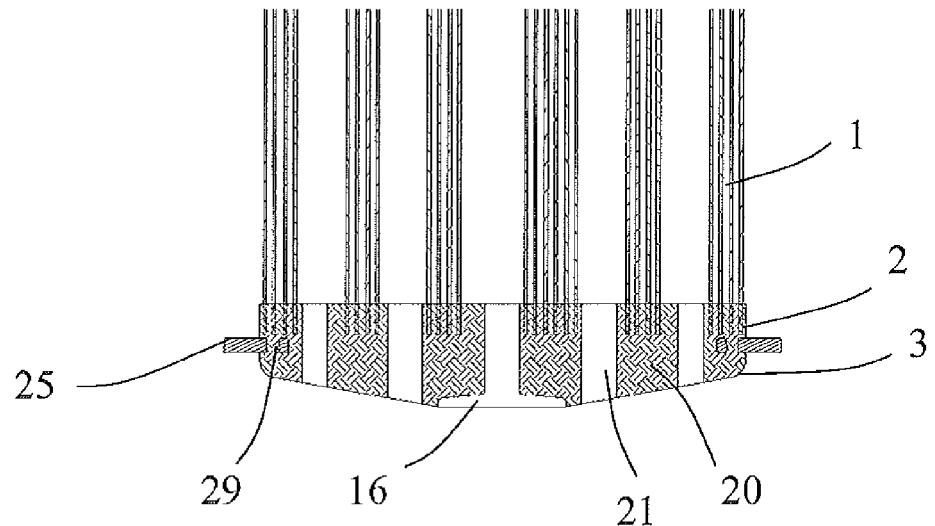
FIG. 1 is a simplified schematic cross-sectional side elevation view of a porous membrane having a potted end secured in a pre-pot according to one embodiment.

Aspects and embodiments of filtration membrane modules and of methods and structures associated with potting ends of the porous membranes in membrane modules as disclosed herein overcome or ameliorate disadvantages of the prior art and provide useful alternatives.

The aspects and embodiments disclosed herein are not limited in application to the details of construction and the arrangement of components set forth in the following description or illustrated in the drawings. The disclosed aspects and embodiments are capable of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Potting assemblies provide means for producing module pots for use in securing and sealing porous membranes in membrane filtration modules. The angle at which the porous membranes are secured within, and exit from, the module pots is an important design factor. Tangled or non-uniform potted membranes can be a precursor for compromise of the integrity of the barrier between feed and filtrate provided by the membranes and potting assembly.

In addition to sealing the ends of porous hollow membranes, a filtration module pot is often designed to perform further functions which may be facilitated by the creation of passages within the pot. For example, passages may formed in the pot for securing structural support elements for the membrane module, or for providing a route for introducing gas into the membrane module. The passages, often containing feed in use, may in some systems be in close proximity to the secured membranes. Penetration of the passages by open ends of hollow fiber membranes can breach the integrity of a barrier between feed and filtrate leading to undesirable contamination of the filtrate stream. Similarly, sections along the length of the fiber membranes may be at risk of damage if they are adjacent a passage forming device when it is removed from the potting assembly during formation of the module pot. Such damage may compromise the integrity of hollow membrane fibers leading to undesirable contamination of the filtrate stream during use. Aspects and embodiments disclosed herein provide apparatus and methods for reducing the probability that open ends of hollow filtration membranes may be exposed to feed in a passage in a membrane pot in which the membranes are secured.

There are numerous methods for producing a porous membrane having a potted end. Static potting and centrifugal potting of membranes in a mold are two common techniques. In a static potting technique, potting material is introduced into a membrane potting mold while the mold is substantially stationary. In centrifugal potting methods, potting material is introduced into a membrane potting mold while the mold is being rotated such that the rotation of the mold forces the potting material toward an end of the rotating mold by centrifugal force.

Figure 2:
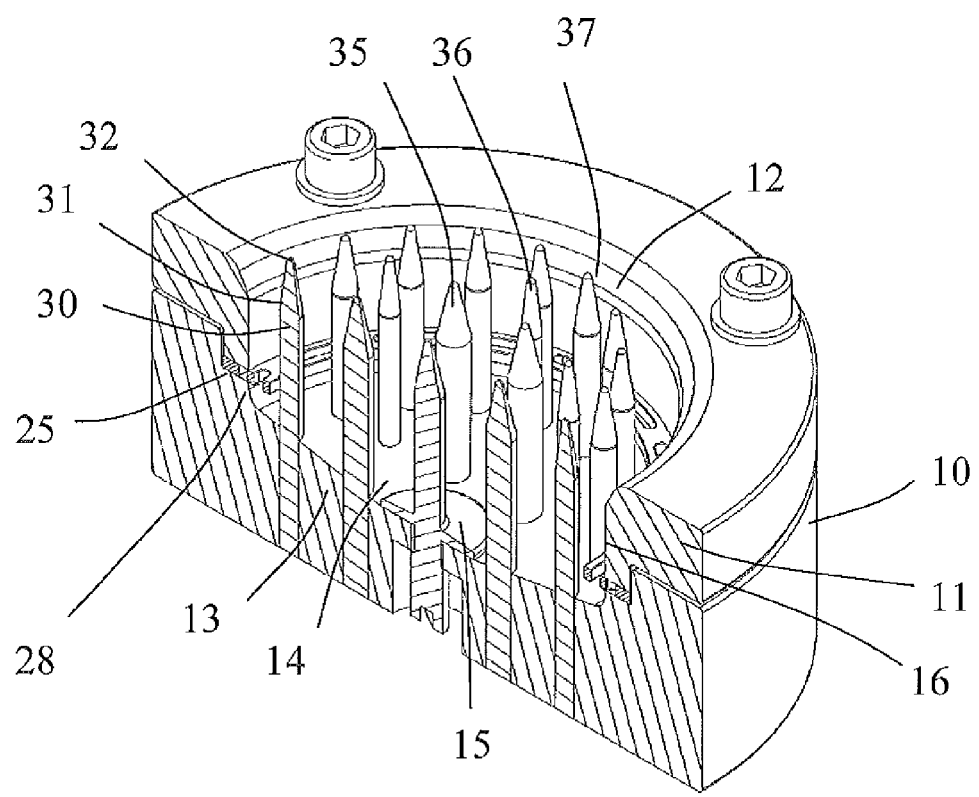
FIG. 2 is a perspective cross-sectional view illustrating a first mold having a first passage forming formation therein according to one embodiment.

Referring to the drawings, FIG. 1 is a cross-sectional side elevation view of a plurality of porous membranes 1 disposed in a pre-pot 3. Specifically, FIG. 1 depicts a plurality of linear vertically oriented porous hollow fiber membranes 1 having proximal ends 2 extending into a cured first pot forming substance 20. It will be appreciated that other forms of porous membrane such as sheets, mats, or tubes may be also used in various embodiments. The pre-pot 3 approximates the shape of a thick disc derived from the contours of a cup shaped mold 10 (FIG. 2). The pre-pot 3 is illustrated with a lower wall that slants downward toward the center of the pre-pot, however, in other embodiments, the lower wall may be substantially planar or may slant downward from a center portion to edge portions of the pre-pot.

Five passageways 21 are visible in the pre-pot 3, evenly spaced apart, and extending between and in the same vertical direction as the porous fibers 1. The passageways 21 have different sized bores, being larger towards the middle of the pre-pot 3. The central passageway 16 has a widened base as a result of the impression left by a de-molding device 15 (FIG. 2). In other embodiments, a greater or lesser number of passageways 21 may be present and the passageways may be spaced and sized in manners other than illustrated. Embodiments disclosed herein are not limited to any particular number, spacing, shape, or sizing of passageways 21.

In FIG. 1 the porous membranes 1 are depicted as not touching one another, and would appear, if positioned in the first mold 10 of FIG. 2, to not touch any other element of the potting assembly. In other embodiments, however, in use, the porous membranes 1 may make contact with other porous membranes 1 and/or elements of the potting assembly. For ease of handling, a bundle of porous membranes 1 can be formed in which the porous membranes 1 touch one another along their length. In various embodiments, the porous membranes 1 are not linear as depicted in FIG. 1, but may be twisted or curved. The porous membranes 1 may assume a non-linear shape when disposed as a bundle and/or when displaced by the plurality of fingers 31 of the first passage forming formation 30, described below.

FIG. 1 depicts an annular disc 25 partially embedded in the periphery of the pre-pot 3. The annular disc 25 includes an outer circumferential portion 26 extending radially outside the pre-pot 3 and an inner circumferential portion 27 extending radially inside the pre-pot 3. An aperture 29 is displayed positioned in the inner circumferential portion 27 of the annular disc. Apertures 28 defined in the outer circumferential portion 27 (FIG. 3) are not visible in FIG. 1 because the apertures 28 and 29 are positioned in an offset arrangement within the annular disc 25.

FIG. 2 depicts an apparatus for securing the porous membrane 1 in the pre-pot 3. A first mold 10, also be referred to as a pre-pot mold, is depicted as generally cup shaped and having a side wall 11, a base-plate 13, and circular open top 12. It will be appreciated that the first mold 10 can be any shape provided it adequately receives the additional elements of the potting assembly. For example, the first mold 10 may be substantially square, rectangular, or shaped as any other regular or irregular polygon desired. A first pot forming substance 20 may be introduced to the first mold 10 at any physical location with the provision of a suitable entry point (not shown). Suitable entry points could, for example, be positioned in the side wall 11 or the base-plate 13. Additionally or alternatively, the first pot forming substance 20 may be introduced to the first mold 10 through the open top 12 of the first mold 10.

FIG. 2 depicts a first passage forming formation 30 including a plurality of linear fingers 31 having externally tapered ends 32 extending upwardly from the base-plate 13 within the mold 10. The fingers 31 are positioned in three evenly distributed concentric circles with a single centrally located finger 31. The fingers 31 have a range of circumferences namely large 35, small 36, and medium 37. The large circumference fingers 35 are assigned to the innermost concentric circle and the single central location. The small circumference fingers 36 are assigned to the middle concentric circle, and the medium circumference fingers 37 to the peripheral concentric circle. It will be appreciated that although the passage forming formation are illustrated as including linear fingers or needles the fingers or needles may be of any suitable shape, configuration, and/or cross-sectional shape which provides for forming passages in the pot forming substance. Further, the fingers or needles are in some embodiments arranged and sized differently than illustrated. In some embodiments, the fingers or needles may be arranged in other than concentric circles, for example, in a regular array. In some embodiments, the fingers or needles may have substantially the same circumferences, and in other embodiments, the circumferences of the fingers or needles may decrease (or in other embodiments, increase) with increasing radial distance from a center of the mold 10.

FIG. 2 depicts the first mold side wall 11, base-plate 13, and the first passage forming formation 30 as three separable elements. Such a configuration allows for practical handling of each element when in use, and for the ability to insert alternate designs of the elements when required. It will be appreciated that alternative configurations are applicable in different embodiments. For example, in some embodiments, the first mold side wall 11, base-plate 13, and the first passage forming formation 30 can exist as one or more integral elements. Such a measure would reduce the number of parts of the potting assembly.

Figure 3:
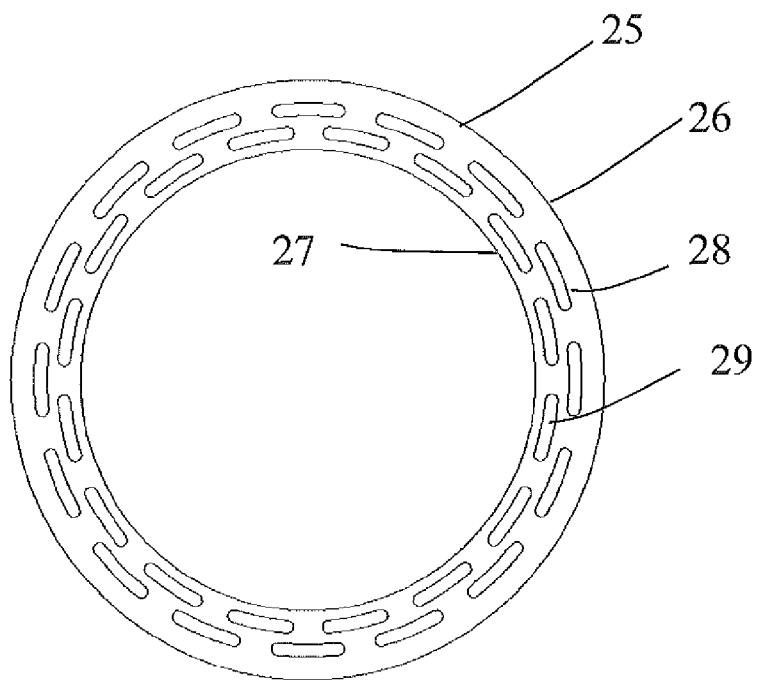
FIG. 3 is a plan view of an annular disc according to one embodiment.

A plan view of the annular disc 25 is seen in FIG. 3. The annular disc 25 has an outer circumferential portion 26 and an inner circumferential portion 27, each including a plurality of apertures 28 and 29, respectively. The plurality of apertures 28, 29 are positioned orthogonally to the planar axis of the annular disc 25, are evenly spaced apart, and are arranged in patterns concentric to the annular disc 25. The apertures 28, 29 provide means to enhance the strength of attachment between the first pot forming substance 20 (and in some embodiments, a second pot forming substance 22) and the annular disc. In other embodiments, the apertures may be shaped differently than illustrated in FIG. 3, for example, as substantially circular or oval apertures. In some embodiments, the apertures may be arranged differently than illustrated in FIG. 3, for example in a single ring or in greater than two concentric rings. Embodiments disclosed herein are not limited to any particular number, shape, or arrangement of apertures in the ring 25.

It will be appreciated that alternative means to facilitate attachment between the annular disc 25 and the first pot forming substance 20 may be utilized in different embodiments. These alternative means may include, for example, one or more of grooves or protuberances on the annular disc 25, or ensuring that an effective chemical bond exists between the materials that make up the annular disc 25 and the first pot forming substance 20 and/or the second pot forming substance 22.

FIG. 2 depicts the annular disc 25 positioned concentric to the first mold 10. The outer circumferential portion 26 of the annular disc 25 is positioned between the separable elements of the side wall 11 and the base-plate 13 of the mold 10 whereas the inner circumferential portion 27 extends radially into the void afforded by the mold 10.

The side wall 11 and the base-plate 13 of the mold 10 are clamped together by screws or bolts 18, 19 extending vertically through the side wall 11 and the base-plate 13. The outer circumferential portion 26 of the annular disc 25 is clamped between the side wall 11 and the base-plate 13 when the screws or bolts 18, 19 are tightened. It will be appreciated that any suitable clamping arrangement may be used, such as by the action of gravity alone or using clipping arrangements. In some embodiments, protrusions jutting from the pre-pot 3 may be clamped to hold the side wall 11 and the base-plate 13 together.

FIG. 2 depicts a disc shaped de-molding device 15 located centrally in the base-plate 13 of the first mold 10. The central passage forming formation passes through the center of the de-molding device 15. In other embodiments, a de-molding device may be alternatively configured. For example, the de-molding device 15 may be located in a region or regions of the base plate 13 which are free of the fingers 31. In some embodiments, the de-molding device may include multiple plates or pins which may be extended upward from the upper surface 14 of the base plate 15 to remove a cured mold from the pre-pot mold. The multiple plates or pins may be individually displaceable, or in some embodiments, may be coupled to a common base.

An embodiment of a method for making the pre-pot 3 comprises positioning at least a portion of one or more porous membranes 1 in the first mold 10 having the first passage forming formation 30 therein, filling the first mold 10 with the first pot forming substance 20, curing the first pot forming substance 20 to form a pre-pot 3, and separating the pre-pot 3 from the first mold 10 and first passage forming formation 30.

When positioned in the potting assembly of FIG. 2, the porous membranes 1 (not shown in FIG. 2) extend downwardly into the first mold 10. The proximal fiber ends 2 become submerged with the addition of the first pot forming substance 20. It will be appreciated that the amount of the first pot forming substance 20 introduced into the mold 10 may be different in different embodiments. In some embodiments it is preferred that the pre-pot 3 includes an amount of the first pot forming substance 20 such that sufficient coverage of the proximal porous membrane ends 2 is provided to achieve a secure anchor and seal of the membranes in the pre-pot. In some embodiments, a secure anchor and seal of the membranes in the pre-pot is achieved when the proximal porous membrane end 2 is covered by the first pot forming substance 20 to a minimum height of approximately 2-5 mm. In other embodiments, the thickness of the layer of the first pot forming substance 20 may be greater than or less than approximately 2-5 mm. In other embodiments, the thickness of the layer of the first pot forming substance 20 may vary from one region to another. In some embodiments where the porous membranes comprise hollow fiber membranes, the first pot forming substance 20 seals open ends of the hollow fiber membranes which are disposed in the first mold 10.

The porous membranes 1 are not shown in FIG. 2 however the position in which they would be positioned during the formation of the pre-pot 3 can be inferred from the corresponding position of the porous membranes 1 in FIG. 1. The plurality of linear fingers 31 of the first passage forming formation 30 extend amongst and parallel to the porous membranes 1 when positioned in the first mold 10. The proximal ends 2 of the plurality of porous membranes 1 extend in the opposite direction to the plurality of linear fingers 31. The linear fingers 31 assume positions between the porous membranes 1, laterally displacing the porous membranes 1 as the porous membranes 1 are introduced into the pre-pot mold, or alternatively, as the linear fingers are introduced into the pre-pot mold subsequent to positioning the porous membranes 1 in the pre-pot mold 10. Portions of the plurality of linear fingers 31 rise above the level of the added first pot forming substance 20 to form the passageways 21 through the first pot forming substance 20.

The passageways 21 depicted in the pre-pot 3 in FIG. 1 are provided to distribute cleaning gas amongst the porous membranes 1 and/or to introduce liquid to be filtered into a membrane module including the porous membranes 1 during use. In some embodiments, the passageways 21 located in the vicinity of the middle of the pre-pot are larger in bore size than passageways 21 located in the vicinity of the periphery of the pre-pot, thereby affording greater air and/or liquid flow through the central region of the finished pot during use. More air flow achieves a more rigorous cleaning effect in a region having a greatest density of porous membranes 1, which is in some embodiments, a region at or proximate a center of a membrane module.

In some embodiments, the first pot forming substance 20 is introduced into the first mold 10 while the first mold 10 is maintained under static conditions as opposed to by centrifugal means. In some embodiments, a number of advantages may be achieved by potting the porous membranes 1 in the first mold 10 under static conditions. For example, the liberation of small air bubbles from the proximal fiber ends 2 may be reduced when the first pot forming substance 20 is introduced into the first mold 10 under static conditions as compared to when the first pot forming substance 20 is introduced into the first mold 10 under centrifugal conditions. In some embodiments, potting the porous membranes 1 in the first mold 10 under static conditions may eliminate the liberation of small air bubbles from the proximal fiber ends 2. Such bubbles may be problematic if present in the first pot forming substance 20 as they can lead to cracking or general breaches of integrity in the cured pot which may contribute to undesirable contamination of the filtrate stream during use. Further, the porous membranes 1 may be maintained in a uniform fashion when potted statically. Some centrifugal potting methods may result in undesirable non-linear, non-level fiber ends 2, or twisted or curved fibers disposed in the pot. Such undesirably positioned fibers can penetrate the passageways 21 formed within the cured pot and contribute to undesirable contamination of the filtrate stream during use.

When the first pot forming substance 20 has become solid, semi-solid, or has cured it is removed from the first mold 10 and the first passage forming formation 30, resulting in the structure including the porous membranes 1 retained in the pre-pot 3 as illustrated FIG. 1. The de-molding device 15 aids in this separation process by means of its detachability from the base-plate 13 of the mold 10. A disengaging force may be exerted on the cured pre-pot 3 by the de-molding device 15 to push the cured pre-pot out of the pre-pot mold and achieve separation between the cured pre-pot 3 and the pre-pot mold.

An embodiment of a method of securing the pre-potted porous membranes 1 in the second pot 4 is described in FIGS. 4 to 8. The method comprises positioning at least a portion of the pre-pot 3 in a second mold 40 having a second passage forming formation 50 therein, filling the second mold 40 with a second pot forming substance 22, curing the second pot forming substance 22, and separating the cured second pot forming substance 22 from the second mold 40 and second passage forming formation 50.

Figure 4:
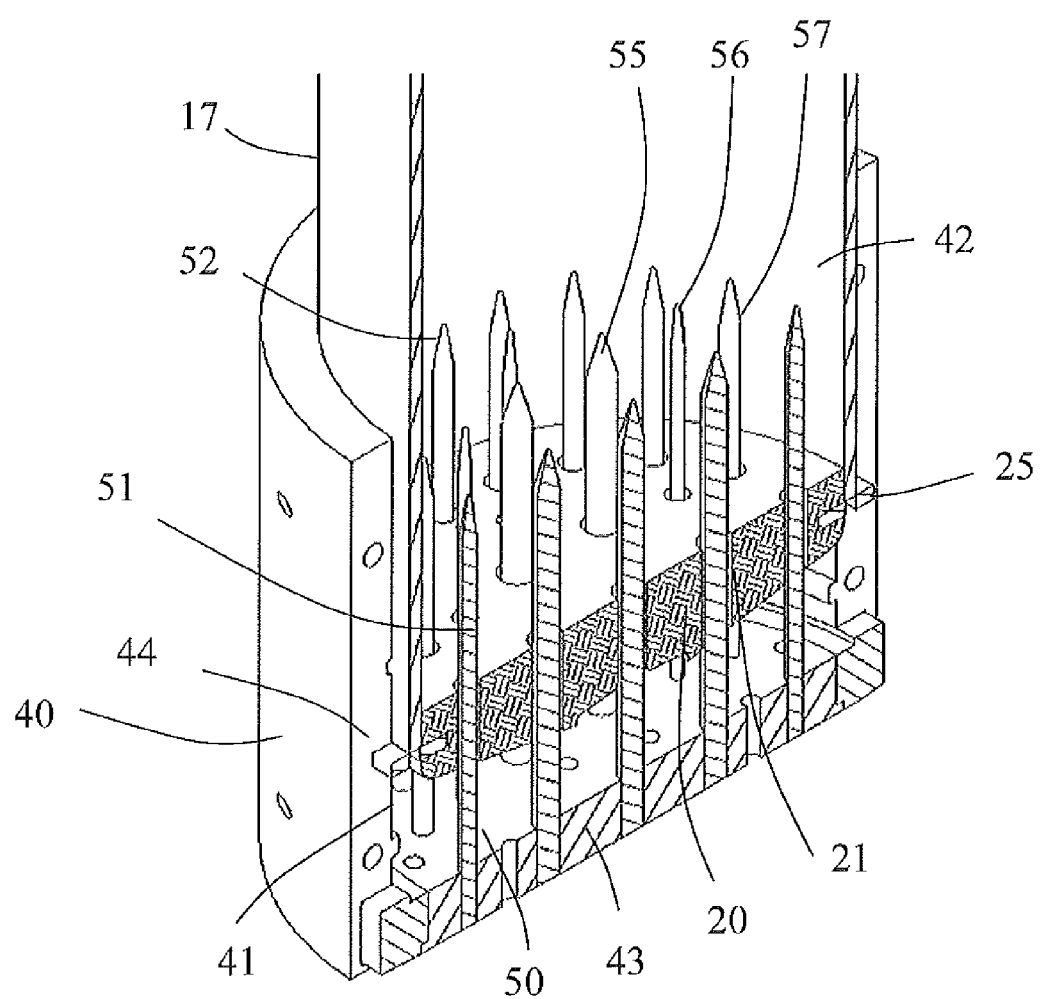
FIG. 4 is a perspective view of a second mold having a second passage forming formation and a pre-pot therein according to one embodiment.
Figure 5:
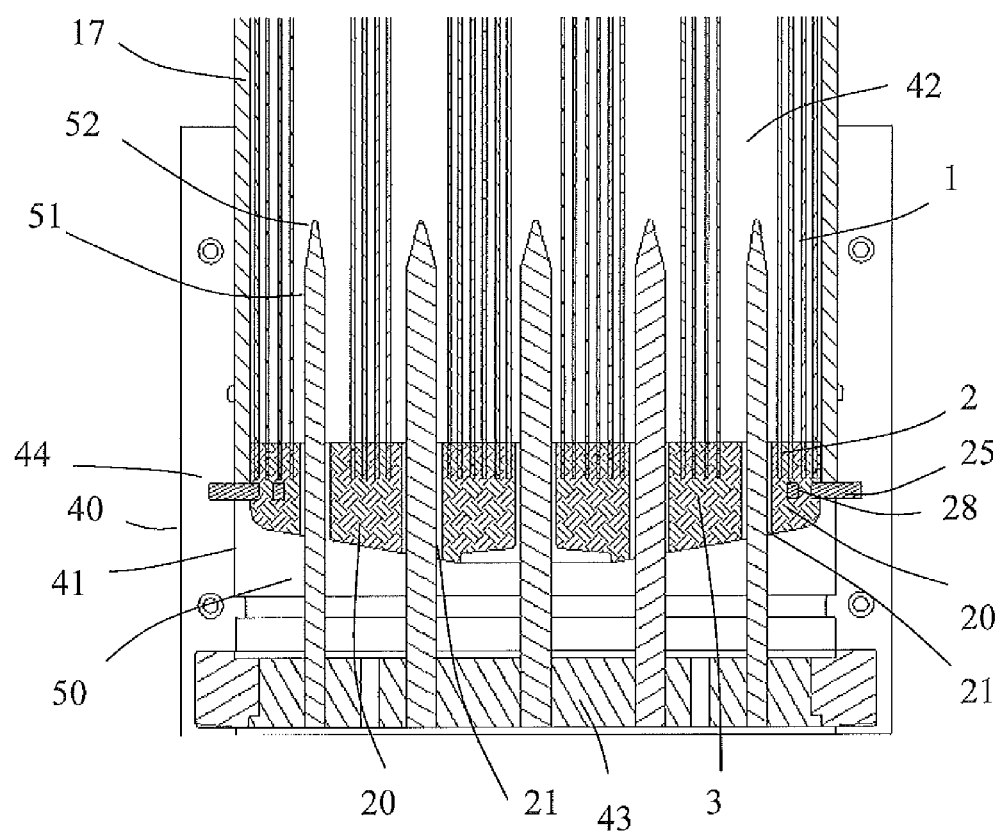
FIG. 5 is a simplified schematic cross-sectional side elevation view of a second mold having a second passage forming formation and a pre-potted porous membrane according to one embodiment.

FIGS. 4 and 5 depict a second mold 40 as a cup shaped structure having a side wall 41, a base-plate 43, and a circular open top 42. It will be appreciated that the second mold 40 can be any shape provided it is configured to adequately receive the additional elements of the potting assembly. For example, the second mold 40 may be substantially square, rectangular shaped, or shaped with a cross section of any other regular or irregular polygon instead of being circular in cross section as illustrated. The second mold 40 may have a cross sectional shape similar to that of the first mold 10, or may be shaped differently than the first mold 10.

In some embodiments, the circular open top 42 of the second mold 40 may be utilized for introducing a second pot forming substance 22 into the second mold. In other embodiments, the second pot forming substance 22 may be introduced to the second mold 40 at any physical location with the provision of a suitable entry point. In some embodiments, the second pot forming substance 22 is introduced by centrifugal means via an entry point (not shown) in the base-plate 43.

FIGS. 4 and 5 do not show the second mold 40 having a de-molding device corresponding to the de-molding device 15 located centrally in the base-plate 13 of the first mold 10. It will be appreciated, however, that such a device could equally be applied to the second mold 40.

Figure 6:
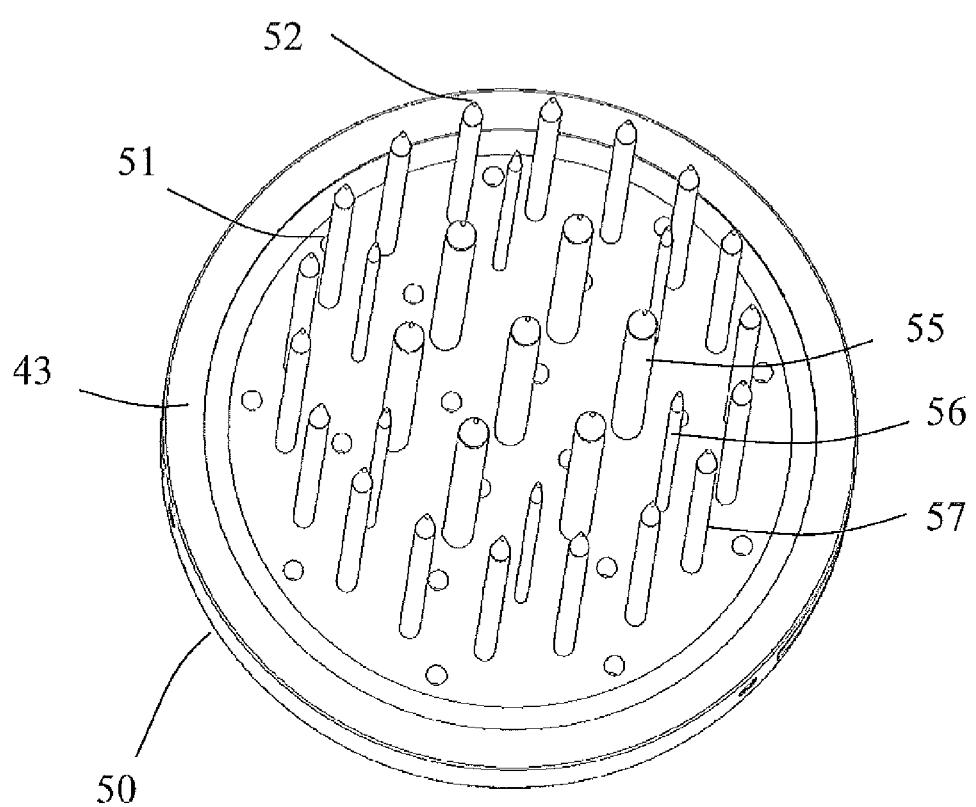
FIG. 6 is a perspective view illustrating a second passage forming formation according to one embodiment.

FIG. 6 depicts a second passage forming formation 50 including a plurality of linear fingers 51, each having tapered ends 52, extending upwardly from the second mold base-plate 43 which is disposed within the second mold 40 as illustrated in FIG. 4. The positioning of the fingers 51 of the second passage forming formation 50 correspond with the positioning of the fingers 31 of the first passage forming formation 30 but are respectively smaller in circumference. Consequently, the fingers 51 extend concentrically through the passageways 21 of the pre-pot 3 when the pre-pot 3 is introduced into the second mold 40. The radius or cross-sectional length of the passageways 21 is in some embodiments approximately 1 mm greater than that of the fingers 51, although in other embodiments the radius or cross-sectional width of the passageways 21 may be greater or less than 1 mm greater than that of the fingers 51. In some embodiments, the fingers 51 of the second passage forming formation 50 have a range of circumferences, namely large 55, small 56, and medium 57. The arrangement and size distribution of the fingers 51 will in some embodiments correspond to the arrangement and size distribution of the fingers 31 in a first mold 10 used to form the passageways 21 in a pre-pot 3 which is to be potted in the second mold 40.

FIG. 5 depicts the plurality of linear fingers 51 of the second passage forming formation 50 extending amongst and parallel to the porous membranes 1 in the second mold 40. The linear fingers 51 rise above the level of the second pot forming substance 22 (not shown), to form the radially reduced passageways 23 seen in FIGS. 7 and 8.

It will be appreciated that alternative second passage forming formation 50 designs may be utilized to form a desired number of passageways 21 in the pre-pot 3 while maintaining a means to effectively secure the pre-pot 3 in the second pot 4. For example, in some embodiments, fewer fingers 51 of the second passage forming formation 50 are provided than passageways 21. In some embodiments, one or more of the linear fingers 51 may have the same or substantially the same circumference as the corresponding passageways 21 though which they pass. Replacing a portion or all of the linear fingers 51 with a means for blocking the entry to the passageways 21 is acceptable if the second pot forming substance 22 adequately secures the pre-pot through contact with a sufficient portion of the outer surface of the pre-pot 3. Any combination of these alternatives may be present in different embodiments.

FIGS. 4 and 5 depict the second mold side wall 41, base-plate 43, and the second passage forming formation 50 existing as three separable elements. Such a configuration allows for practical handling of each element when in use, and for the ability to insert alternate designs of the elements when required. It will be appreciated that in different embodiments, the second mold side wall 41, base-plate 43, and the second passage forming formation 50 may exist as one or more integral elements. Such a measure would reduce the number of parts of the potting assembly.

FIGS. 4 and 5 depict a peripheral region of the outer circumferential portion 26 of the annular disc 25 extending into a supporting groove 44 defined within the side wall 41 of the second mold 40. The pre-pot 3, by means of the embedded annular disc 25, is supported by the groove 44 such that the arrangement is stable within a centrifuge during the addition of the second pot forming substance 22. The groove 44 may be disposed at a height on the side wall 41 of the second mold 40 which affords the deposit of a sufficient quantity of the second pot forming substance 22 to achieve a desired level mechanical stability for the potted arrangement. In some embodiments, the groove 44 may be disposed at a height on the side wall 41 of the second mold 40 approximately 10 mm from the lower end of the side wall 41. In other embodiments, alternative heights can be effective given alternative mold configurations and pot forming substances.

The annular disc 25 in the embodiment illustrated in FIGS. 4 and 5 has the additional function of providing a means of support for a membrane shell or screen 17. The membrane shell or screen 17 may comprise a hollow cylinder or a conduit having an alternate shape which may match that of the second mold 40 in embodiments in which the second mold 40 has a non-circular cross section. The membrane shell or screen 17 may include a proximal end disposed on an upper surface of the annular disc 25 and abutting the peripheral surface of the pre-pot 3. The membrane shell or screen 17 may be porous or solid depending upon the requirements of the filtration system.

Figure 7:
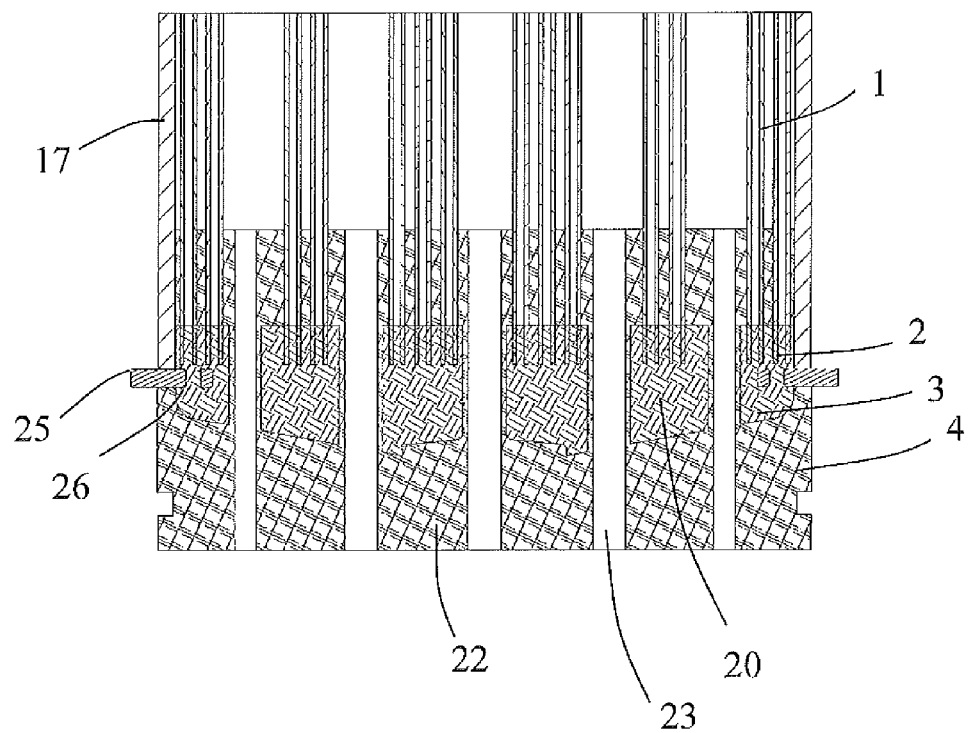
FIG. 7 is a cross-sectional side elevation view illustrating a pre-potted porous membrane in a second pot according to one embodiment.
Figure 8:
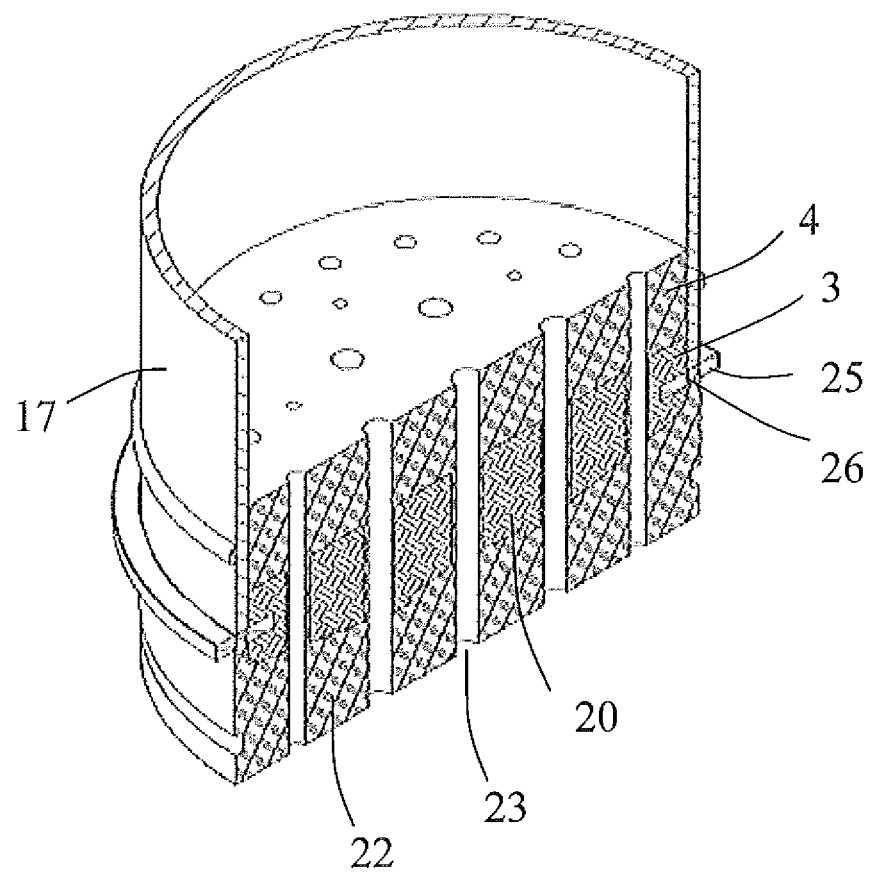
FIG. 8 is a perspective cross-sectional view illustrating a pre-pot in a second pot (membranes not shown) according to one embodiment.

FIGS. 7 and 8 depict the porous membranes 1 secured in the pre-pot 3 and in a second pot 4. In some embodiments, the second pot forming substance encloses or surrounds at least a portion of the pre-pot 3. In some embodiments, the second pot forming substance is present on both an upper and a lower surface of the pre-pot 3, and may also coat the internal walls of the passages 21 in the pre-pot 3. In some embodiments, the second pot forming substance 22 completely surrounds the pre-pot 3. In some embodiments, the second pot forming substance 22 completely surrounds the pre-pot 3 except for portions of the periphery of the pre-pot abutting the membrane shell or screen 17. The second pot forming substance 22 may also surround portions of the porous membranes 1 which extend upwardly from the pre-pot 3, and may contact a portion of the membrane shell or screen 17. In some embodiments, the second pot forming substance 22 extends to a level approximately 50 mm above the annular disc 25, although the second pot forming substance 22 may extend to a level greater or less than 50 mm above the annular disc 25 in different embodiments. The second pot forming substance 22 may adhere to and secure the membrane shell or screen 17 to the pre-pot 3. It will be appreciated that in some embodiments, it is not necessary for the second pot forming substance 22 to completely encase the pre-pot 3 to mechanically stabilize the second pot 4.

FIGS. 7 and 8 depict passageways 23 extending coaxially through the pre-pot 3 passageways 21, the former being radially smaller than the latter. In some embodiments the passageways 23 may be about 1 mm radially smaller than the respective passageways 21 through which they pass. In other embodiments, the passageways 23 have the same radial or cross sectional dimensions as the corresponding passageways 21 or may have radial or cross sectional dimensions greater or less than 1 mm smaller than the corresponding passageways 21. Such an arrangement provides an adequate means of access for the second pot forming substance 22 to surround the pre-pot 3 during the potting process. In addition, in some embodiments, the second pot forming substance 22 provides a second means of sealing damaged or exposed open ends of porous membranes 1 thereby reducing the potential for undesirable contamination of a filtrate stream during use of the finished filtration module. For example, if an open end of a membrane 1 is exposed to an internal volume of a passageway 21, the second pot forming substance 22 may seal the open end of the membrane 1, ensuring a seal between feed and filtrate during use of a module including the membrane 1.

The porous membranes 1 in FIGS. 7 and 8 are depicted in the same configuration as those within the pre-pot 3 of FIG. 1. It will be appreciated that the explanation of the variations in porous membrane 1 positioning and the porous membrane 1 interaction with the first passage forming means 30 is equally applicable to the porous membranes 1 and the second passage forming means 50.

In some embodiments, it may be advantageous to add the second pot forming substance 22 to the second mold 40 centrifugally rather than statically. Adding the second pot forming substance 22 to the second mold 40 with a centrifugal potting process, through greater forces, may achieve a more effective distribution of the second pot forming substance 22 throughout any voids afforded by the elements within the second mold 40. Undesirable air pockets in the second pot forming substance 22 may be reduced in size or quantity or eliminated when the second pot forming substance 22 is added to the second mold 40 with a centrifugal potting process. However, it will be appreciated that the second pot forming substance 22 could equally be introduced with the second mold 40 maintained under static conditions.

The pot forming substances 20, 22 desirably include substances which adhere well to the porous membranes which are secured in the finished membrane pot. The pot forming substances also desirably include substances which impart rigidity and strength to the finished membrane pot and which cure within a reasonable amount of time. The pot forming substances are desirably chemically inert and are not degraded by contact with liquids which a filtration module including the pot may be utilized to filter or by chemical cleaning solutions which may be utilized to clean the porous membranes. Further, the pot forming substances desirably do not significantly expand or contract with changes in temperature or when contacted by liquids which a filtration module including the pot may be utilized to filter or by chemical cleaning solutions which may be utilized to clean the porous membranes so that delamination of the potting materials from each other or from other portions of the membrane module including the membrane pot does not occur. When multiple pot forming materials are used to form the membrane pot, the multiple pot forming materials desirably expand and contract at substantially the same rate with changes in temperature or exposure to various liquids so that the multiple pot forming materials do not delaminate from one another. Also, when multiple pot forming materials are used to form the membrane pot, the multiple pot forming materials desirably form strong chemical bonds with each other so that the multiple pot forming materials do not delaminate from one another. In some embodiments, the pot forming material surrounding the portions of the membranes entering into the pot exhibits at least some flexibility to accommodate swaying or lateral movement of the membranes during use without causing shearing of the membranes from the pot.

In some embodiments, the pot forming substances may be made up of resins, for example, polyurethanes or epoxy, however, it will be appreciated any suitable substance may be used. The pot forming substances may include additives, for example, to increase the flexibility of the pot forming substances. The first pot forming substance 20 may comprise a different or the same material as the second pot forming substance 22. For example, in some embodiments, the first pot forming substance 20 includes a material which more strongly adheres to the porous membranes 1 than the second pot forming substance 22. Further, in some embodiments, the second pot forming substance 22 includes a material which is more flexible than the first pot forming substance 20. For example, the first pot forming material may include an epoxy or a urethane, and the second pot forming material may include a silicone material or a urethane which is more flexible than the epoxy or urethane of the first pot forming material. Providing for the second pot forming substance 22 to be flexible may reduce the probability that the porous membranes 1 may shear from the first pot forming substance 20 due to lateral mechanical forces which the porous membranes 1 may be subject to during use.

Having thus described several aspects of at least one embodiment, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. A method of forming a filtration module, the method comprising:
    positioning a portion of a hollow fiber membrane in a first potting mold;
    positioning an annular disc including a plurality of apertures in the first potting mold;
    introducing a sufficient amount of the first pot forming substance into the first potting mold to cover at least a portion of an inner circumference of the annular disc with the first pot forming substance, the first pot forming substance surrounding the portion of the hollow fiber membrane;
    curing the first pot forming substance to form a pre-pot;
    separating the pre-pot from the first potting mold;
    positioning at least a portion of the pre-pot in a second potting mold;
    introducing a second pot forming substance into the second potting mold, the second pot forming substance surrounding at least a portion of the pre-pot and at least a portion of the hollow fiber membrane;
    curing the second pot forming substance to form a membrane pot;
    and separating the membrane pot from the second potting mold.

2. The method of claim 1, further comprising forming an aperture in the pre-pot.

3. The method of claim 2, wherein forming the aperture in the pre-pot comprises forming the aperture in the pre-pot with a finger member extending upwardly from a base of the first potting mold.

4. The method of claim 1, wherein separating the pre-pot from the first mold comprises pushing the pre-pot out of the first mold with a de-molding device disposed in the base of the first mold.

5. The method of claim 4, further comprising forming an aperture in the second pot forming substance.

6. The method of claim 5, wherein forming the aperture in the second pot forming substance comprises forming the aperture in the second pot forming substance coaxial with the aperture formed in the pre-pot.

7. The method of claim 6, wherein forming the aperture in the second pot forming substance comprises forming the aperture in the second pot forming substance with a cross sectional area less than a cross sectional area of the aperture formed in the pre-pot.

8. The method of claim 7, wherein forming the aperture in the second pot forming substance comprises forming the aperture in the second pot forming substance with a finger member extending upwardly from a base of the second potting mold.

9. The method of claim 8, further comprising disposing a peripheral region of an outer circumferential portion of the annular disc in a supporting grove defined in a side wall of the second mold.

10. The method of claim 9, further comprising coupling a membrane shell to the membrane pot, the membrane shell surrounding at least a portion of the porous membrane.

11. A method of forming a filtration membrane module, the method comprising:
    positioning at least a portion of a hollow fiber membrane in a first mold having a first passage forming formation therein;
    at least partially filling the first mold with a first pot forming substance;
    curing the first pot forming substance;
    separating the cured first pot forming substance from the first mold and first passage forming formation to form a pre-pot;
    positioning an annular disc including a plurality of apertures in the pre-pot;
    positioning at least a portion of the pre-pot in a second mold having a second passage forming formation therein;
    at least partially filling the second mold with a second pot forming substance;
    curing the second pot forming substance; and
    separating the cured second pot forming substance from the second mold and second passage forming formation.

12. The method of claim 11, further comprising providing the second passage forming formation with a cross-sectional area smaller than a cross-sectional area of the first passage forming formation.

13. The method of claim 12, wherein the first mold is statically filled with the first pot forming substance.

14. The method of claim 13, wherein the second mold is centrifugally filled with the second pot forming substance.

15. The method of claim 14, wherein filling the second mold with the second pot forming substance comprises filling the second mold with a sufficient quantity of the second pot forming substance such that the second pot forming substance encapsulates the pre-pot.

16. The method of claim 15, wherein filling the first mold with the first pot forming substance and filling the second mold with the second pot forming substance comprise filling the first mold and the second mold with a same substance.

17. The method of claim 15, wherein filling the first mold with the first pot forming substance and filling the second mold with the second pot forming substance comprise filling the first mold and the second mold with different substances.

18. The method of claim 11, further comprising positioning the pre-pot in the second mold by disposing a portion of the annular disc in a supporting grove defined in a side wall of the second mold.

19. A membrane filtration module comprising:
- a hollow fiber membrane having an end secured in a pre-pot formed of a first potting material and at least partially enclosed in a second potting material;
- an annular disc including a plurality of apertures and having an internal circumferential portion secured in the first potting material and an external circumferential portion in contact with the second potting material; and
- a membrane shell coupled to the second potting material and in contact with the external circumferential portion of the annular disc, the membrane shell surrounding at least a portion of the porous membrane.

20. The membrane filtration module of claim 19, further comprising at least one aperture defined in the pre-pot.

21. The membrane filtration module of claim 20, further comprising an aperture defined in the second potting material and disposed within the at least one aperture defined in the pre-pot.

22. The membrane filtration module of claim 21, wherein the first potting material is a same material as the second potting material.

23. The membrane filtration module of claim 21, wherein the first potting material is a different material than the second potting material.

* * * * *